(12) United States Patent
Feliciano-Perez

(10) Patent No.: US 9,750,365 B2
(45) Date of Patent: Sep. 5, 2017

(54) HOLDER FOR DENTAL AND SIMILAR ACCESSORIES

(71) Applicant: Edwin Antonio Feliciano-Perez, Aguada, PR (US)

(72) Inventor: Edwin Antonio Feliciano-Perez, Aguada, PR (US)

( * ) Notice: Subject to any disclaimer, the term of this patent is extended or adjusted under 35 U.S.C. 154(b) by 0 days.

(21) Appl. No.: 14/862,601

(22) Filed: Sep. 23, 2015

(65) Prior Publication Data

US 2017/0055750 A1 Mar. 2, 2017

Related U.S. Application Data

(62) Division of application No. 13/733,491, filed on Jan. 3, 2013, now Pat. No. 9,149,141.

(51) Int. Cl.
| | |
|---|---|
| *A47G 25/06* | (2006.01) |
| *A47B 81/02* | (2006.01) |
| *A47F 7/02* | (2006.01) |
| *A47G 29/08* | (2006.01) |
| *A47F 7/00* | (2006.01) |
| *A47K 1/09* | (2006.01) |
| *F16B 7/04* | (2006.01) |

(52) U.S. Cl.
CPC ............ *A47G 29/08* (2013.01); *A47F 7/0028* (2013.01); *A47F 7/02* (2013.01); *A47K 1/09* (2013.01); *F16B 7/0413* (2013.01)

(58) Field of Classification Search
CPC ..... A47B 87/02; A47B 57/00; A47B 96/1425; A47B 81/02; B25H 3/04; A47G 29/08; A47G 25/0664; D06F 57/04; A47F 5/02; A47F 7/00; A47F 7/02; A47F 3/44; A47F 5/06; A47F 5/04; A47F 7/0021; A47F 7/0028; A47J 37/0763; A47K 1/09; A47K 5/00; A61C 1/14; A61C 1/00; A61C 3/00; A61C 3/04; A61C 15/00; A61C 15/14; A61C 15/16
USPC ... 211/1, 1.3, 107, 175, 196, 197, 205, 70.6, 211/65, 13.1, 60.1, 85.13, 66, 187, 188; 433/29, 33, 77, 108, 229, 25
See application file for complete search history.

(56) References Cited

U.S. PATENT DOCUMENTS

| | | | | |
|---|---|---|---|---|
| 3,076,557 A | * | 2/1963 | Husted | ....................... A45F 3/44 108/148 |
| 3,857,493 A | * | 12/1974 | Bourne | ................... D06F 57/04 211/197 |
| 4,807,837 A | * | 2/1989 | Gawlik | ............... A61M 5/1415 211/196 |

(Continued)

*Primary Examiner* — Jennifer E Novosad
(74) *Attorney, Agent, or Firm* — Eugenio J. Torres-Oyola; Victor Rodriguez-Reyes; Ferraiuoli LLC

(57) ABSTRACT

Holders for maintaining personal items such as dental and hygienic products are disclosed. The holders include a series of sections, particularly, holding sections having different geometrical structures related to the different items intended to be hold. In this manner, they may be assembled at the convenience of the user and its holding units may be increased or decreased as well as selected based upon the particular structure of the holding units at the will of the users. The holder may be self-standing when using a disclosed base or alternatively, it may be secured to a commonly used toothbrush supporting base or even be supported via a suction cup over a given surface.

16 Claims, 23 Drawing Sheets

(56) References Cited

U.S. PATENT DOCUMENTS

| | | | | |
|---|---|---|---|---|
| 5,127,342 A * | 7/1992 | Taylor | A47B 57/265 | 108/147.13 |
| 5,676,263 A * | 10/1997 | Chang | A47B 57/26 | 108/147.13 |
| 5,906,284 A * | 5/1999 | Hammerstrom | B25H 1/02 | 211/107 |
| 6,010,017 A * | 1/2000 | Michaelis | A47F 5/04 | 211/107 |
| 6,257,426 B1 * | 7/2001 | Masunaka | A47B 46/00 | 108/107 |
| 6,260,488 B1 * | 7/2001 | Yang | A47B 57/545 | 108/107 |
| 6,905,335 B2 * | 6/2005 | Fischer | A61C 1/12 | 433/215 |
| 7,059,484 B1 * | 6/2006 | Goldberg | A47B 47/0083 | 211/153 |
| 7,207,450 B1 * | 4/2007 | Franklin | A45F 3/44 | 108/25 |
| 7,866,494 B1 * | 1/2011 | Emile | A47G 25/0671 | 211/182 |
| 8,016,134 B1 * | 9/2011 | Templin | F16M 11/06 | 211/107 |
| 8,047,492 B2 * | 11/2011 | Wang | B62H 3/12 | 211/106.01 |
| 8,157,225 B2 * | 4/2012 | Kephart | F16M 11/045 | 248/177.1 |
| 8,322,666 B2 * | 12/2012 | Duemmel | A45B 11/00 | 248/163.1 |
| 8,567,614 B2 * | 10/2013 | Sankey | A47F 5/02 | 211/7 |
| 9,149,141 B2 * | 10/2015 | Feliciano-Perez | A47G 29/08 | |
| 2002/0148799 A1 * | 10/2002 | Denny | A47B 47/021 | 211/186 |
| 2003/0015486 A1 * | 1/2003 | Chen | A47F 5/02 | 211/70 |
| 2003/0164348 A1 * | 9/2003 | Seng | D06F 57/04 | 211/196 |
| 2003/0173321 A1 * | 9/2003 | Craft | A47B 49/006 | 211/144 |
| 2003/0173484 A1 * | 9/2003 | Hsieh | F16M 11/28 | 248/291.1 |
| 2007/0058035 A9 * | 3/2007 | Fujie | A61B 1/00048 | 348/66 |
| 2007/0272641 A1 * | 11/2007 | Wong | A47B 47/00 | 211/188 |
| 2008/0156759 A1 * | 7/2008 | Lai | A47B 87/0207 | 211/187 |
| 2015/0060621 A1 * | 3/2015 | Sabounjian | F16B 12/42 | 248/243 |

* cited by examiner

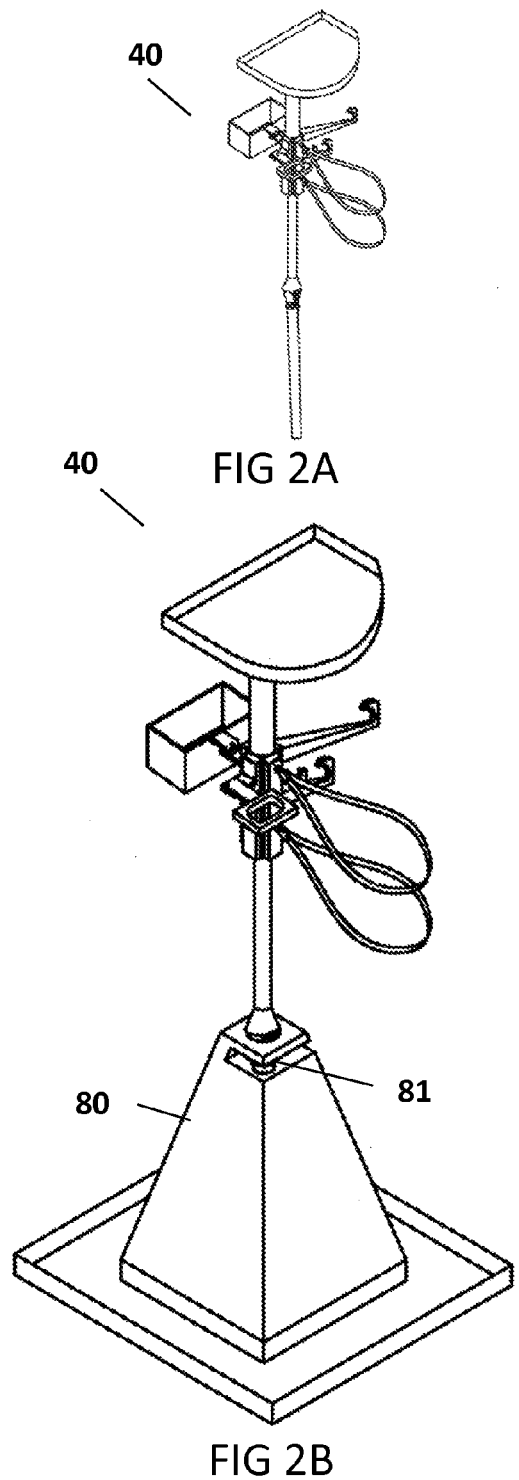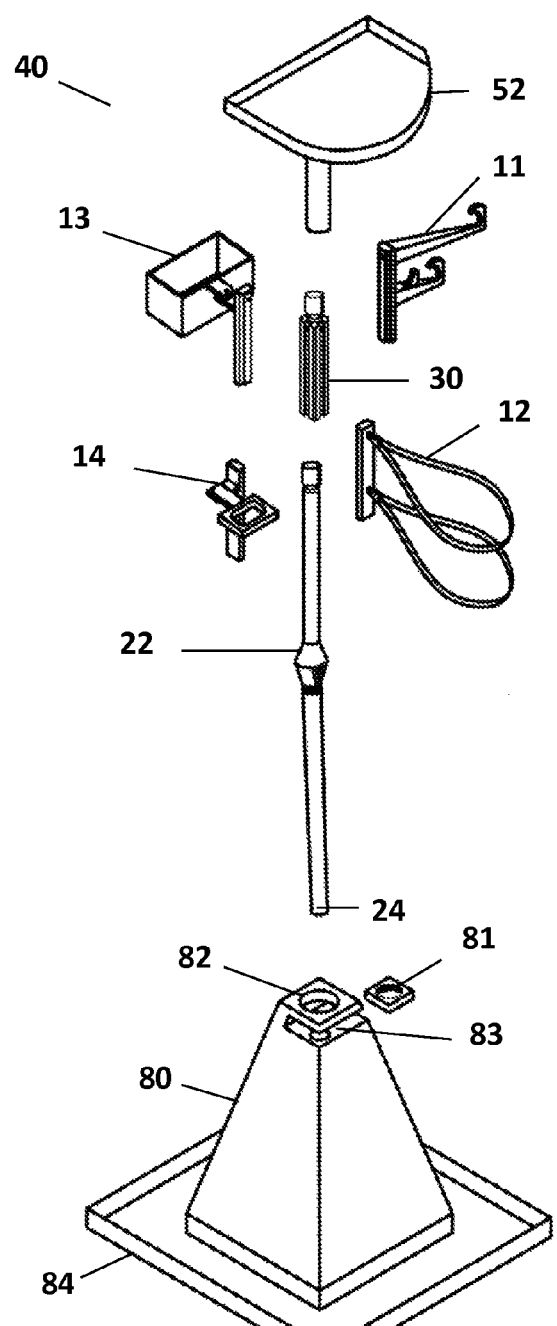
FIG 2A
FIG 2B
FIG 2C

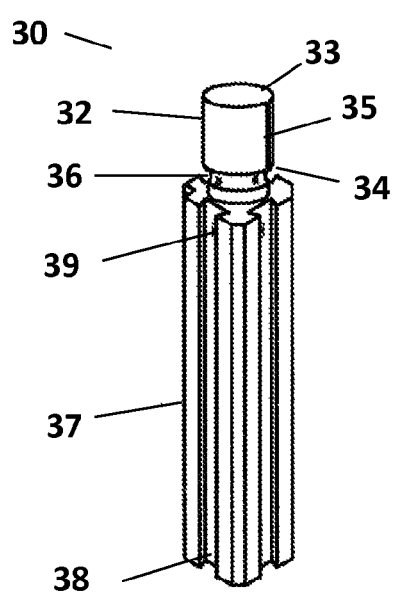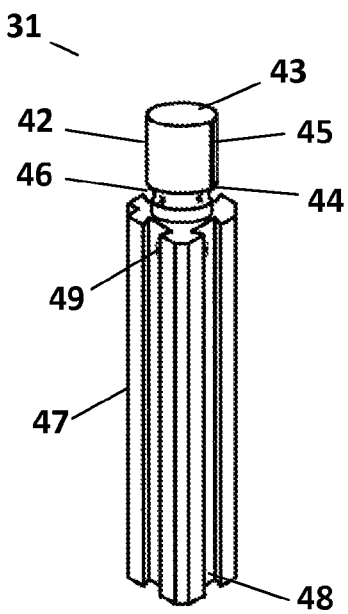
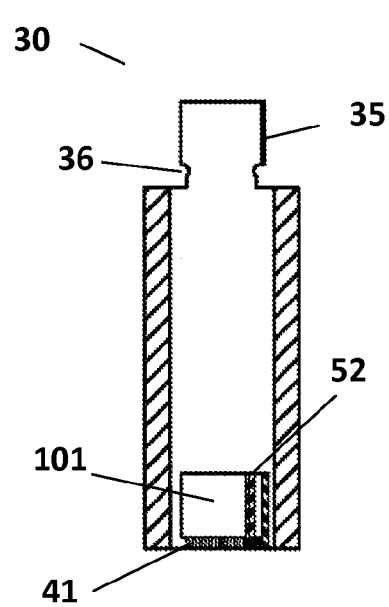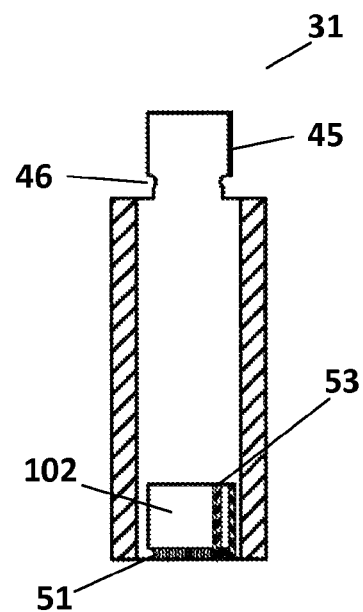
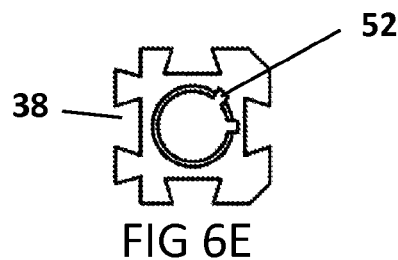

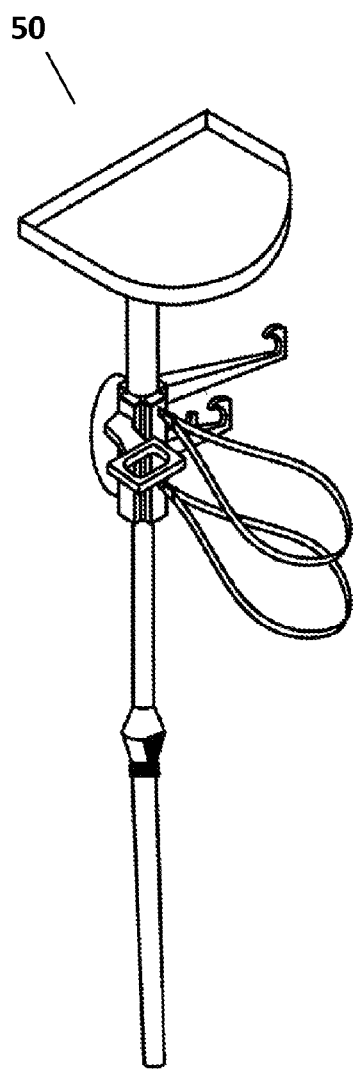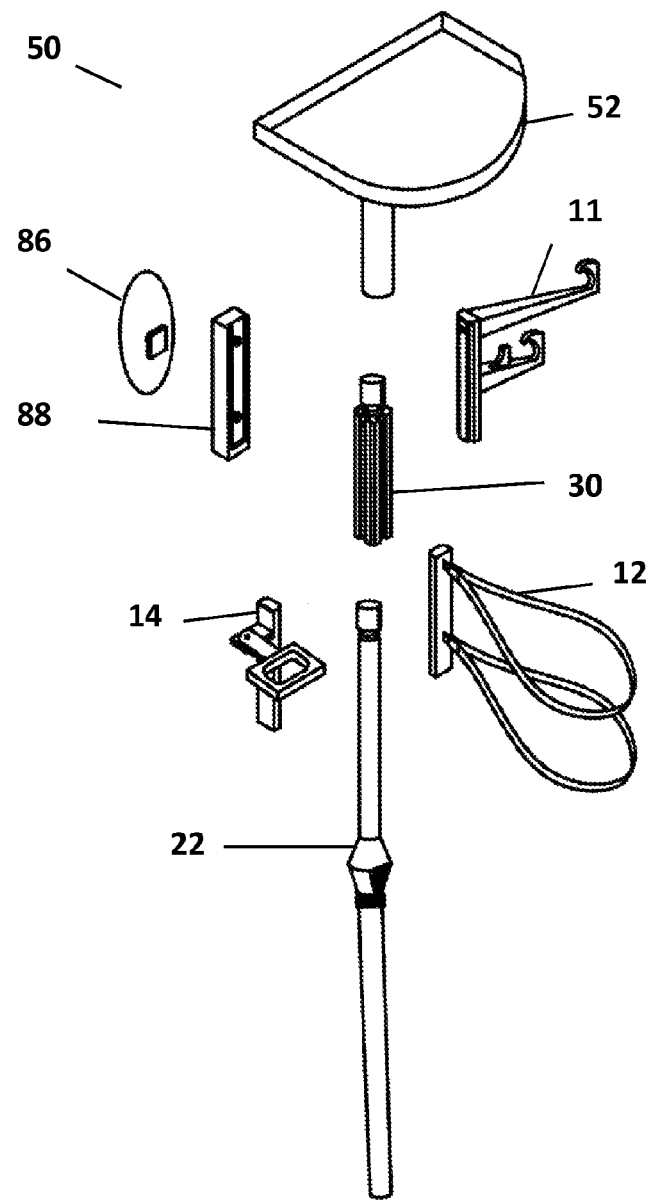
FIG 12
FIG 13

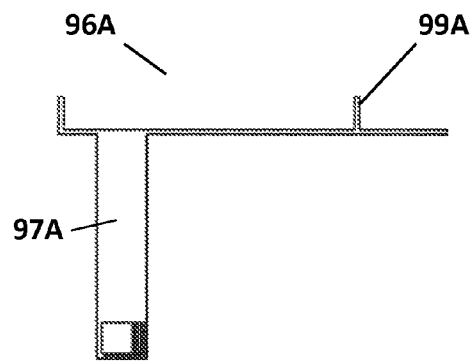
FIG 17A
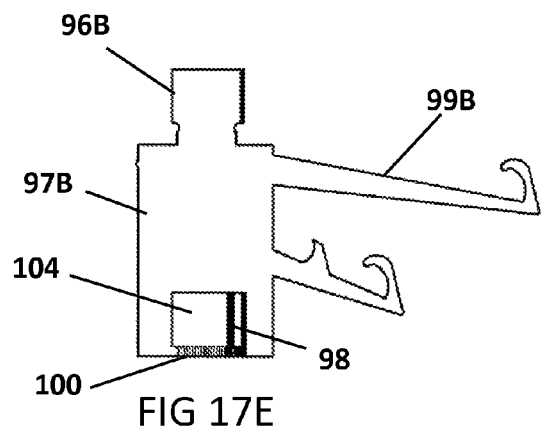
FIG 17E
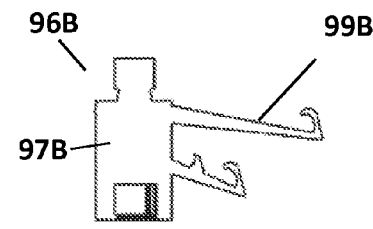
FIG 17B
FIG 17F
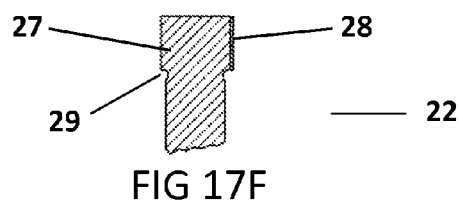
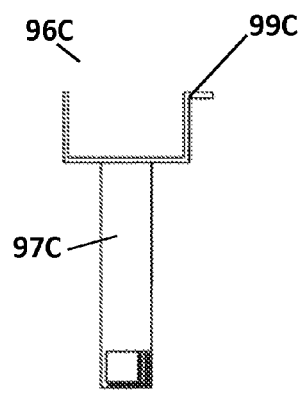
FIG 17C
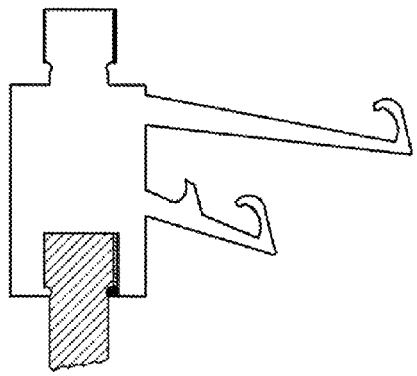
FIG 17G
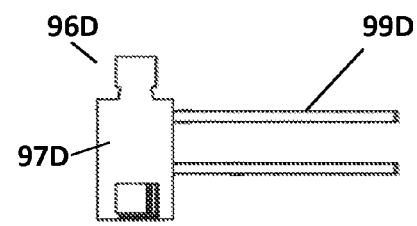
FIG 17D

US 9,750,365 B2

HOLDER FOR DENTAL AND SIMILAR ACCESSORIES

FIELD OF THE INVENTION

The present invention relates generally to holders. More particularly, it is directed to holders for dental and similar personal items, wherein the holding unit have different geometrical shapes related to the shapes of the item being held and the amount of holding units may be increased or decreased at the user's will.

BACKGROUND OF THE INVENTION

Dental personal items, such as orthodontic retainers and/ or their boxes, dentures and the like requires to be kept in a clean, dry and safe place due to its own nature in order to reduce the risk of contamination of such items with microorganisms that may transmit diseases to the user. In some instances, whenever the user is not using such items, they may be stored in a particular and hygienic place. Such care in storing such items is very important in order to promote the health of the user. In another instance the items are not used because the user forgets to use them because they are in a hidden place.

Similarly, personal care products, such as dental floss, manual razors, toothbrushes and the like also require being kept in a clean and hygienic place. Unfortunately, such items are commonly kept at the top of the bathroom's wash basin, which is a highly humid and usually a place wherein bacteria and other microorganism may found an excellent reproductive environment.

Similarly, jewelry items, such as rings, earrings and the like requires a safe place to be store, particularly whenever the user is not wearing such items. In many occasions, such items may be lost while the user is on the shower or results uncomfortable while the user is sleeping.

Thus, a particular holder may be highly convenient in order to hygienically, properly and safely, save and store such personal items in order to reduce contact of said items with bacteria and other disease related microorganisms.

SUMMARY OF THE INVENTION

It is an object of the instant invention to provide a holder for dental items such as toothbrushes, orthodontic retainers and/or their boxes and similar items, wherein such items are kept in a clean, dry, accessible and safe area. Another object of the invention is to provide a holder for dental and jewelry items wherein the holding units of said holder may be varied to the convenience and needs of the user. Yet another object of the invention is to provide a holder, wherein the holding units used to hold different personal use items may be increase by the user, because it modular design. In still another object of the invention is to provide a holder wherein the holding units have different structural shapes or holding elements that are related to the items being held in order to properly and safely hold said items. In yet still another object is to provide a holder that may be secured in different manners, for instance using a standing base, a suction cup or a toothbrush support.

BRIEF DESCRIPTION OF THE DRAWINGS

The nature and objects of the present invention and its advantages will be more clearly and easily understood after reading the following non-restricted description of preferred embodiments thereof, made with reference to the following drawings, in which:

FIG. 2A illustrates a perspective view of a second of the embodiments according to the invention. FIG. 2B illustrates an alternative manner of assembling and using some of the embodiments according to the invention shown in FIG. 2A and FIG. 2C illustrates an exploded view of the FIG. 2B and its parts thereof.

FIGS. 6A, 6B, 6C, 6D and 6E illustrate different views of the inserting unit used in different embodiments of the invention.

FIG. 12 illustrates another embodiment according to the invention.

FIG. 13 illustrates an exploded view of the embodiment according to the invention illustrated in FIG. 12 and its parts thereof.

FIGS. 17A and 17G illustrate cross sectional views of the holding units and the mechanism of coupling main elongated body and the holding units in the embodiments illustrated in FIGS. 15A to 15D.

DETAILED DESCRIPTION OF THE PREFERRED EMBODIMENTS

The following detailed description illustrates the invention by way of example and is not limited to the particular limitations presented herein as principles of the invention. This description is directed to enable one skilled in the art to make and use the invention by describing embodiments, adaptations, variations and alternatives of the invention. Potential variations of the limitations herein described are within the scope of the invention. Particularly, the size and shapes of the invention's elements illustrated in the discussion may be varied and still provide holders having different sizes or geometric shapes, that are within the scope of the instant invention.

The instant invention is directed to a holder, useful in supporting different personal items, such as orthodontics retainers and/or their boxes, toothbrushes, dental floss, jewelry, manual razors and the like. Said holder is intended to be used mostly in the bathroom and dormitory area. Each embodiment of the invention provides one or more holding units, which is designed accordingly to the shape or geometry of the item being supported. The holder herein described may be made of a solid, strong material such as metal, plastic or any other suitable material and more preferably of plastic. Each part of the holder may be mold individually or it may be mold as a whole or as the entire holder.

Figure 1A:
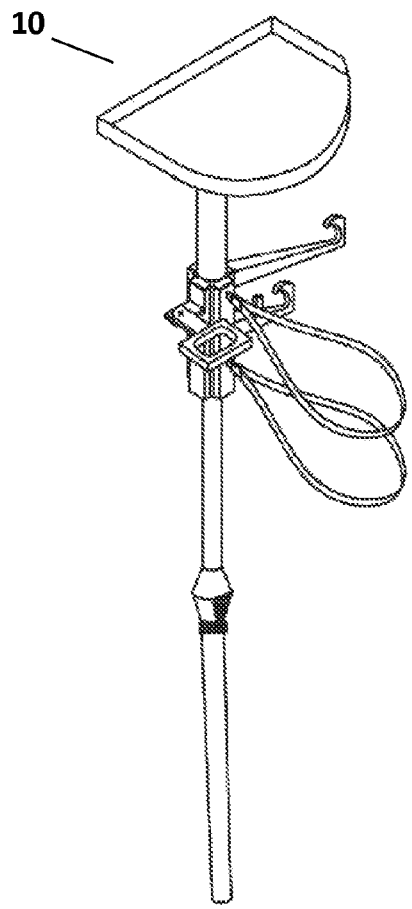
FIG. 1A illustrates a perspective view of one of the embodiments according to the invention.
Figure 1B:
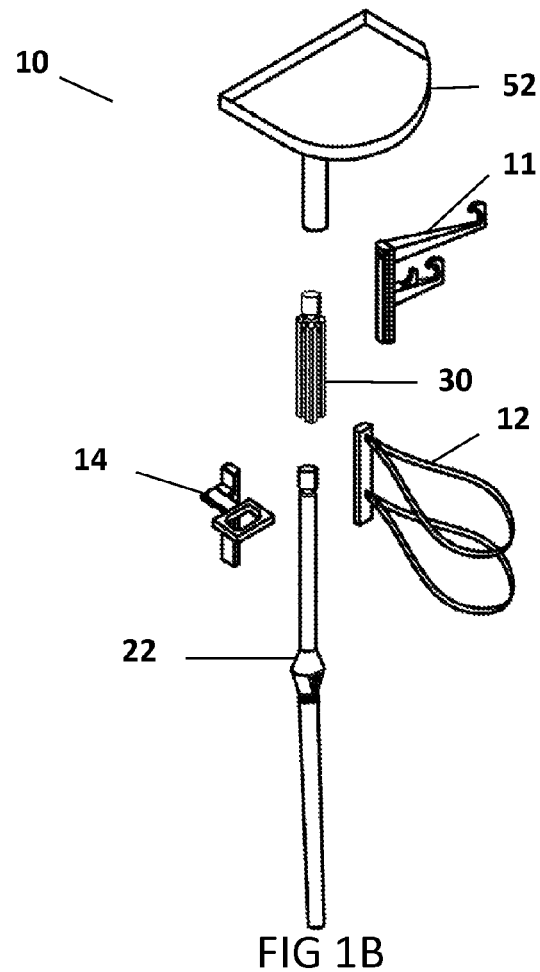
FIG. 1B illustrates an exploded view of the embodiment according to the invention illustrated in FIG. 1A and its parts thereof.
Figure 3:
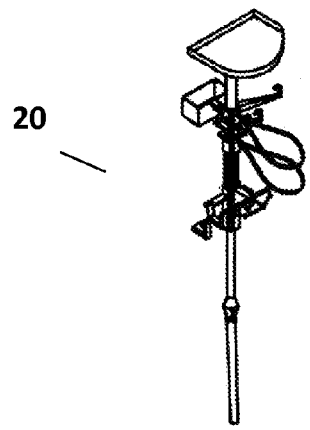
FIG. 3 illustrates a perspective view of a third of the embodiments according to the invention.
Figure 4A:
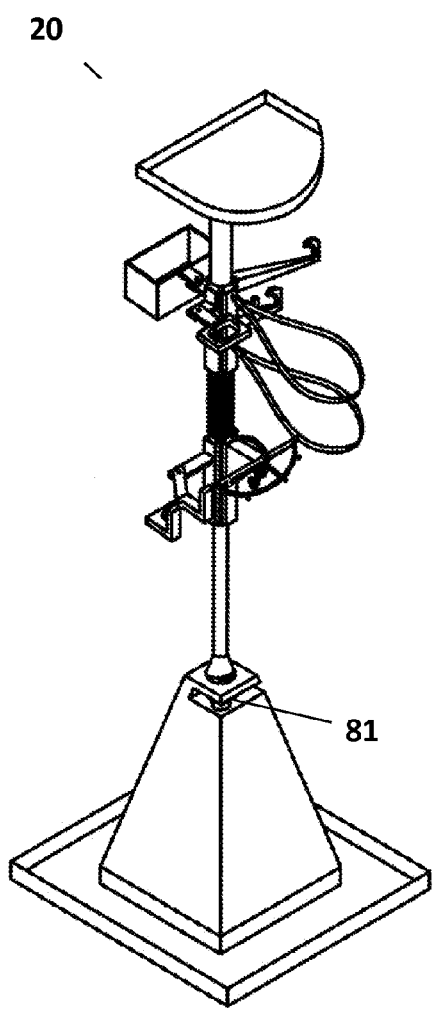
FIG. 4A illustrates an alternative manner of assembling and using some of the embodiments according to the invention shown in FIG. 3.
Figure 4B:
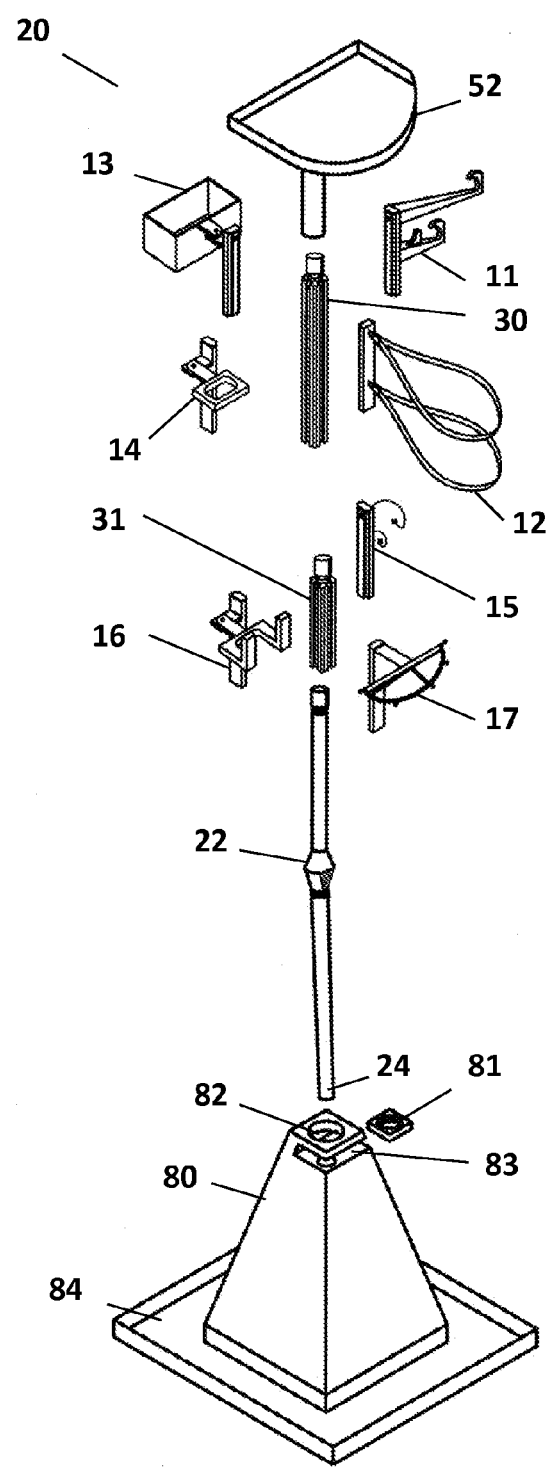
FIG. 4B illustrates an exploded view of the FIG. 4A and its parts thereof.
Figures 5A, 5B, 5C:
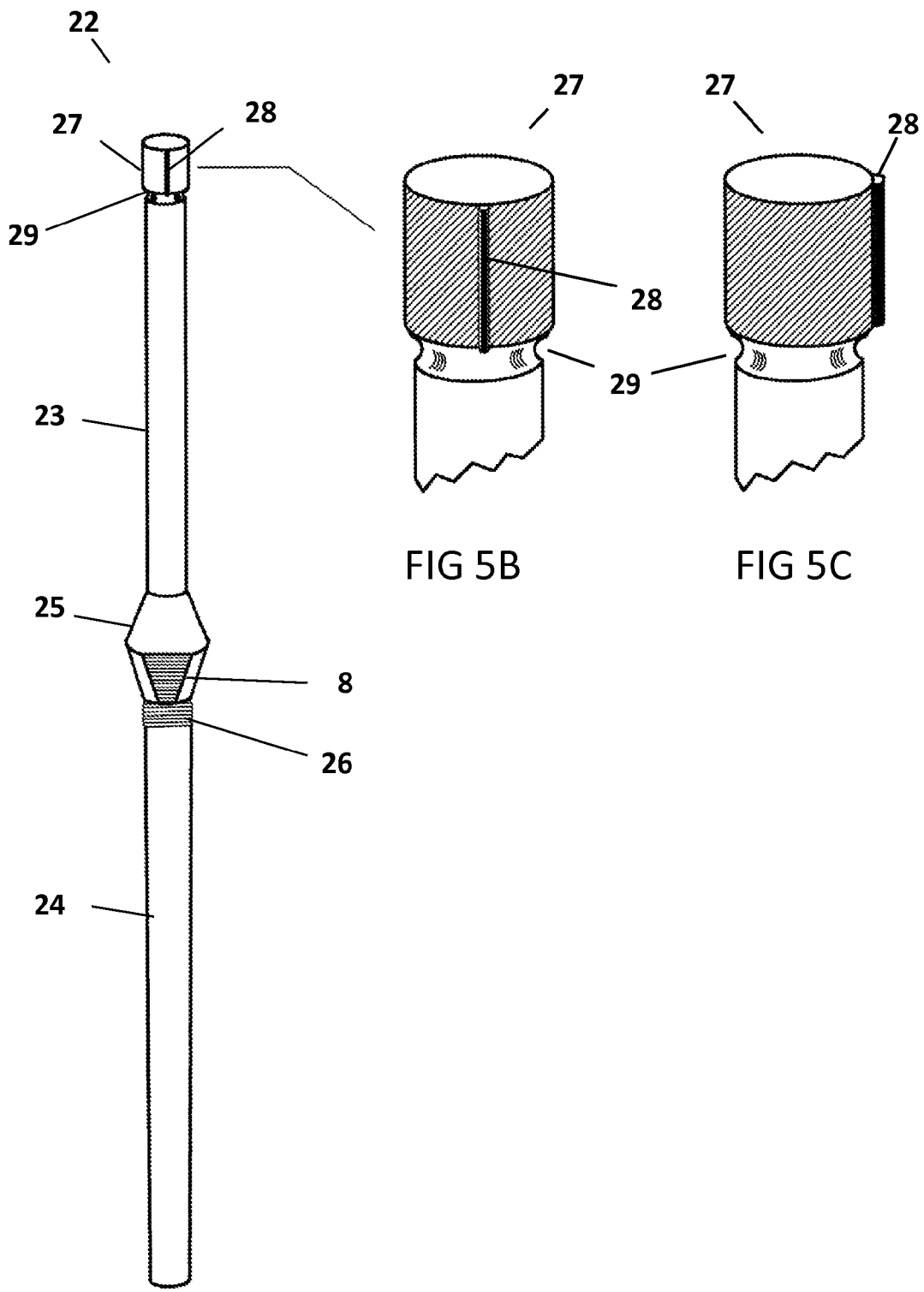
FIG. 5A illustrates a perspective view of the elongated main body used as central support in some of the embodiments of the invention.
FIG. 5B and FIG. 5C illustrate two perspective views of the top section of the main elongated body illustrated in FIG. 5A.
Figure 7:
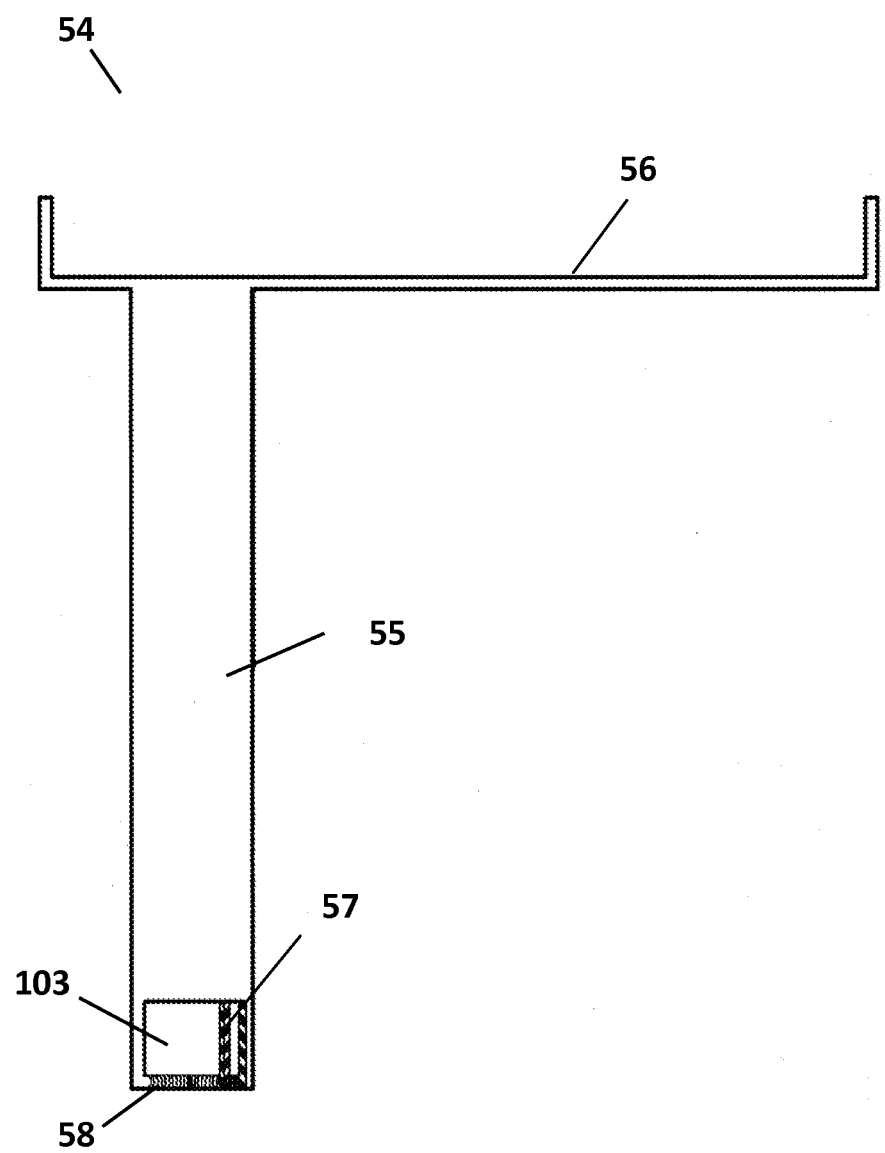
FIG. 7 illustrates a cross sectional view of the tray-shaped unit used in some embodiments according to the instant invention.

More particularly, FIG. 1A and FIG. 3 illustrate embodiments 10 and 20 of the invention comprising a series of common elements. For instance, on FIG. 1A, embodiment 10 is shown having all its parts already assembled. FIG. 1B illustrates an exploded view of the embodiment 10, showing all its components. Similarly, FIG. 3 illustrates embodiment 20 already assembled while FIG. 4A illustrates the embodiment 20 over a stand 80 and FIG. 4B illustrates an exploded view of the embodiment 20 over a stand 80.

In both embodiments 10 and 20, a main elongated body 22 is required. As illustrated in FIGS. 1-4; 5A to 5C, it comprises upper head 27 at the upper part of said main elongated body 22. Said upper head 27 has at least one straight flange 28 placed from top to bottom of the external surface of said head 27. It also comprises a groove 29, located at the lower end of upper head 27. Said head 27 is permanently connected to a first elongated section 23. Main elongated body 22 also comprises a second elongated section 24 and a fastening section 25 located between the first elongated section 23 and the second elongated section 24. Fastening section 25 has preferably a wider diameter than the diameter of the first and second elongated sections, 23, 24 and it also has at it fastening section 25, a threaded section 26 and a flat section 8.

As illustrated in FIGS. 1A and 1B, embodiment 10 comprises a single hollow inserting unit 30. Details of said hollow inserting unit 30 are illustrated in FIGS. 6A to 6E. FIG. 6A illustrates a perspective view of said hollow inserting unit 30, FIG. 6C represents its cross sectional view while FIG. 6E represents its bottom view. Said inserting unit 30 comprises a cylindrical top section 32 having an upper part 33 and a lower part 34. Said cylindrical top section 32 is connected to a hollow rectangular main body 37 at its lower part 34. Cylindrical top section 32 comprises at least one straight flange 35 placed from top to bottom of the external surface of top section 32. It also comprises groove 36 below its lower end 34. On the other hand, hollow rectangular main body 37 comprises an external sliding channel 38 on each one of its sides. At the upper surface of each channel 38 it also comprises indentation 39; which is a small hole on the surface of said external channel's surface 38. At the interior surface of the hollow rectangular body 37, there is an internal hollow section 101 and at least one internal sliding channel 52, as illustrated in FIGS. 6C and 6E. Furthermore, an internal bump 41 is located at the lower end of the hollow internal section 101 of inserting unit 30, as illustrated more clearly on FIG. 6C.

A main difference between embodiment 10 and 20, embodiment 20 requires a second hollow inserting unit 31. As illustrated in FIGS. 3, 4A and 4B. Embodiment 20 comprises a second hollow inserting unit 31, which has the same characteristics or limitations of first inserting unit 30. For instance, second inserting unit 31 as illustrate on FIGS. 6B and 6D, comprises a cylindrical top section 42 having an upper part 43 and a lower part 44. Said cylindrical top section 42 is connected to a hollow rectangular main body 47 at its lower part 44. Cylindrical top 42 comprises at least one straight flange 45 placed from top to bottom of the external surface of top section 42. It also comprises groove 46 below its lower end 44. On the other hand, hollow rectangular main body 47 comprises an external sliding channel 48 on each one of its sides. At the upper surface of each channel 48 it also comprises indentation 49, which is a small hole on the surface of external channel 48. At the interior surface of the hollow rectangular body 47, there is a hollow internal cavity 102 having at least one internal sliding channel 53 as illustrated in FIG. 6D. Furthermore, an internal bump 51 is located at the lower end of the hollow internal section 102 of inserting unit 31. Inserting units, 30 and 31 may have the same or different length. In one aspect of the embodiment, it is preferably that one is longer than the other, as illustrated in FIG. 4B.

Embodiments 10 and 20 also comprise a tray unit 54, having at its upper section a tray-shaped holding section 56 and at its lower external surface a hollow cylindrical section 55, as illustrated in FIGS. 1-4 and 7. Inside said hollow cylindrical section 55, there is an internal hollow cavity 103, having at least one internal channel 57. It also comprises an internal bump 58 at the lower section.

Figure 10A:
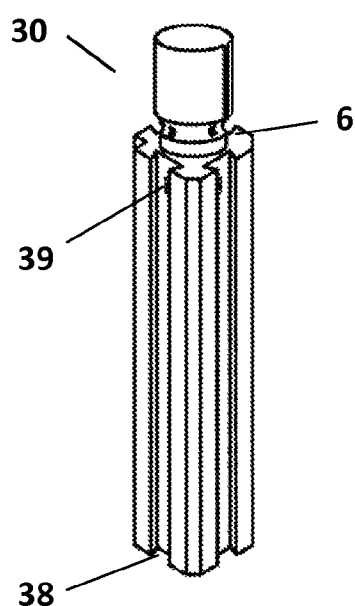
FIGS. 10A, 10B, 10C and 10D illustrate the manner in which the holding units are inserted into the inserting unit in different embodiments according to the invention.
Figure 10B:
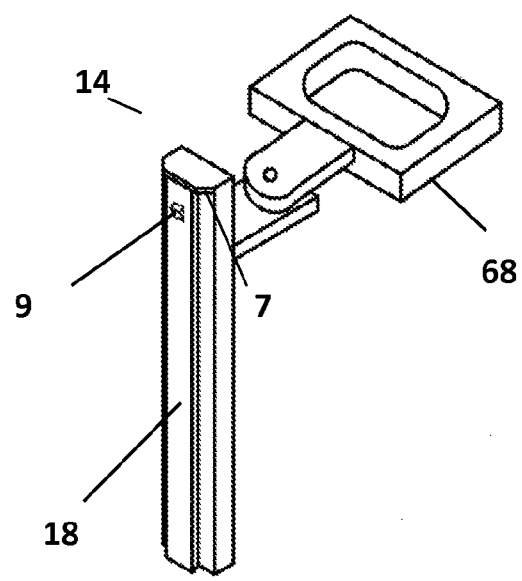
Figure 10C:
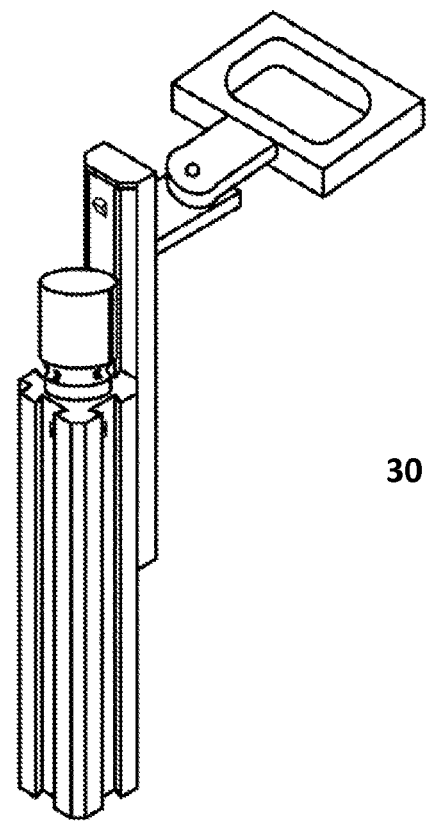
Figure 10D:
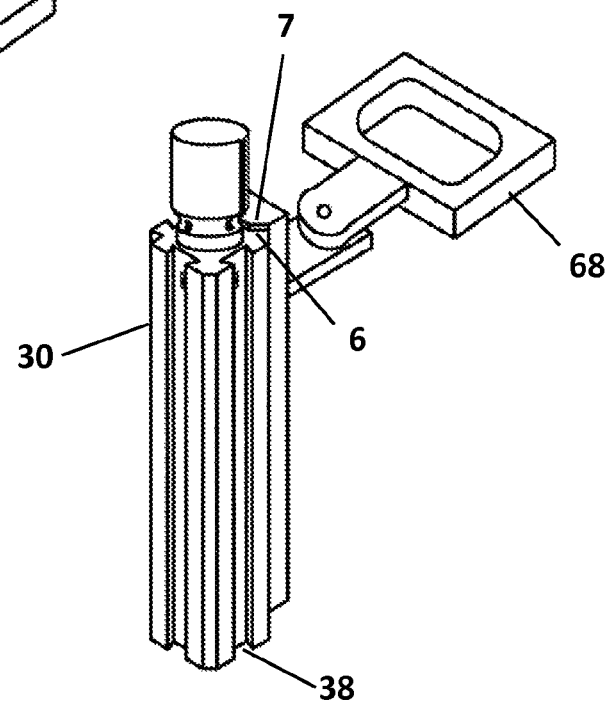
Figure 11A:
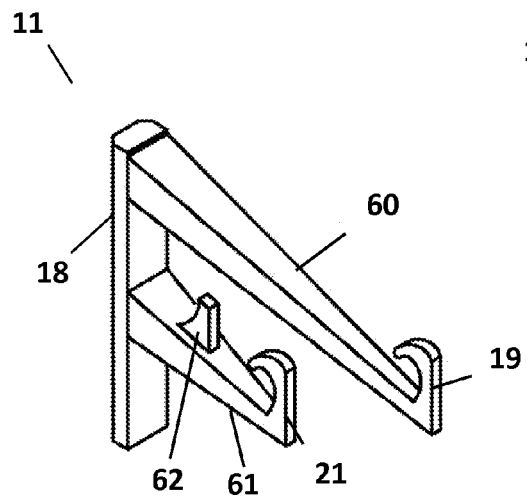
FIG. 11A to 11G illustrate perspective views of different holding units used in some embodiments of the instant invention.
Figure 11B:
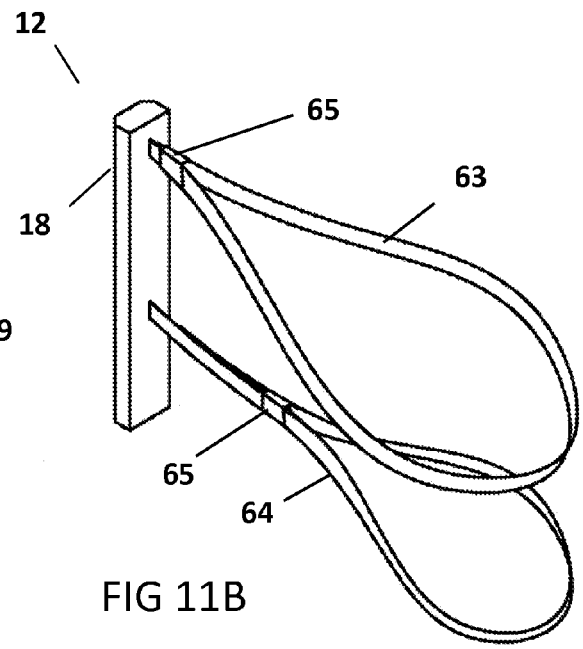
Figure 11C:
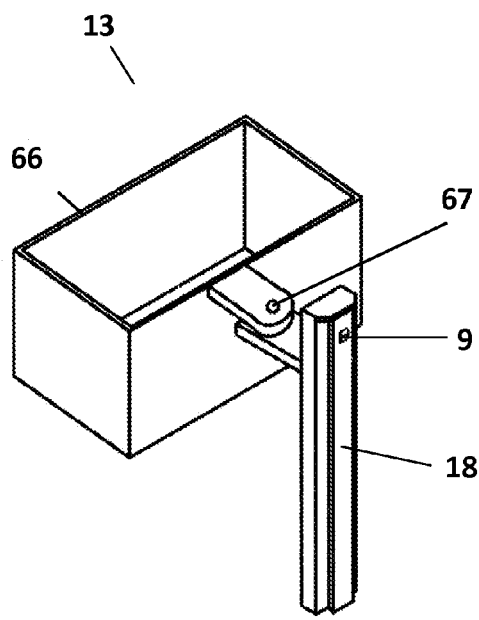
Figure 11D:
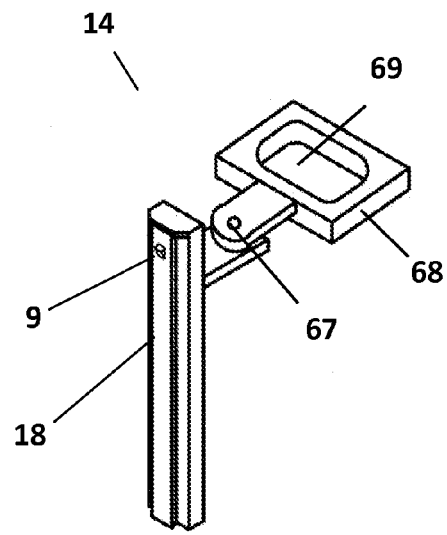
Figure 11E:
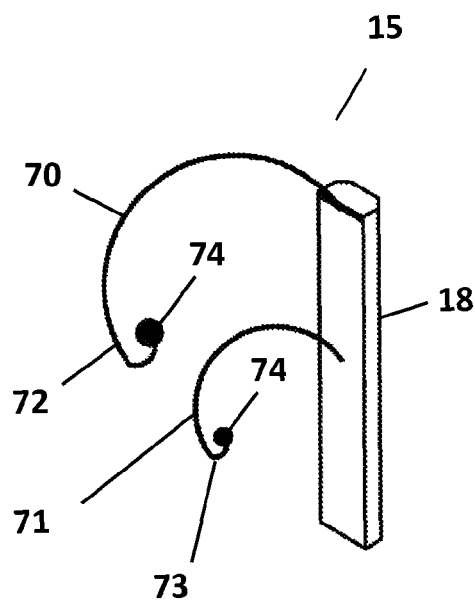
Figure 11F:
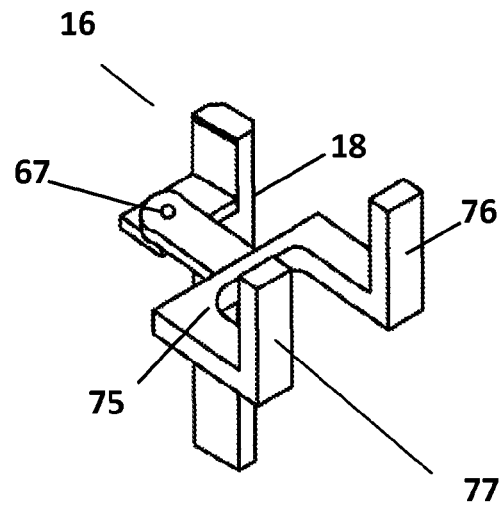
Figure 11G:
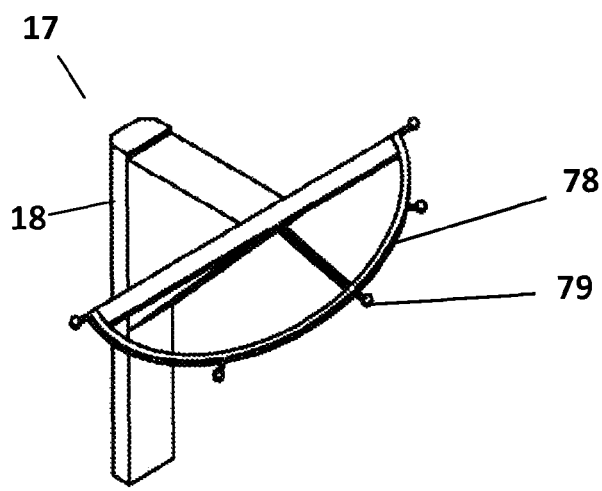

The embodiment 10 and 20 also provides multiple holding units 11 to 17, each of them comprising sliding section 18 as illustrated on FIGS. 11A to 11G, a flange 9 as illustrated on FIGS. 10B and 11C, which is located at the upper end of said sliding section 18 and on its external surface. Additionally, as illustrated on FIGS. 10B and 10D, there is a stopping flange 7 at top of the sliding section 18 which is wider than the external channel 38 of the inserting unit 30 or external channel 48 of the inserting unit 31, to interrupt the movement once the top flange 7 of the sliding section 18 hit the top 6 at the sides of the external channel 38 of the inserting unit 30 or the external channel 48 of the inserting unit 31. FIGS. 11A-11G illustrate different designs of the holding units 11 to 17, having different geometries or shapes, which had been designed particularly according to the geometry of different personal use items intended to be supported by the embodiments of the described holder. For instance, holding unit 11 illustrated in FIG. 11A comprises two extended arms-shaped holding elements 60 and 61 preferable of different length and preferable aligned, having a curved distal ends 19 and 21 and a flange 62 located between the sliding section 18 and the distal curved end 21 to keep some distance between items store on the holding unit 11, these extended arms are useful in holding orthodontic retainers and jewelry items. Holding unit 12 illustrated in FIG. 11B, comprises a set of lace-shaped holding elements 63 and 64, having an adjusting ring 65 to increase or decrease the sizes of the lace-shaped holding elements 63 and 64, which is useful in holding orthodontic retainers among others items. On the other hand, holding unit 13 on FIG. 11C comprises a box-shaped holding element 66, capable of swivel by effect of the joint connector 67, which is useful in holding dental floss and similar items; on the other hand, holding unit 14 illustrated in FIG. 11D comprises a rectangular-shaped unit 68 with a joint connector 67 that allows it to rotate or swivel and further comprising a hole 69 at its center. Said holding unit 14 is useful in holding toothbrushes and similar items. Similarly, holding unit 15 on FIG. 11E comprises semi-circular wires 70 and 71, each one of them having a curved distal ends 72, 73 and a round solid distal end 74, which are useful in holding orthodontic retainers and jewelry items. Furthermore, holding unit 16 on FIG. 11F comprises U-shaped structure 75 with a joint connector 67 that allows it to swivel or rotate and having its distal ends 76, 77 bend over at an upright position, which is useful for holding manual razors and the like. FIG. 11G shows a holding unit 17 comprising a D-shaped structure 78 having a series of solid round units 79 around the external surface of said D-shaped structure 78, which is useful to hold orthodontic retainers and jewelry items among others items.

Figure 8A:
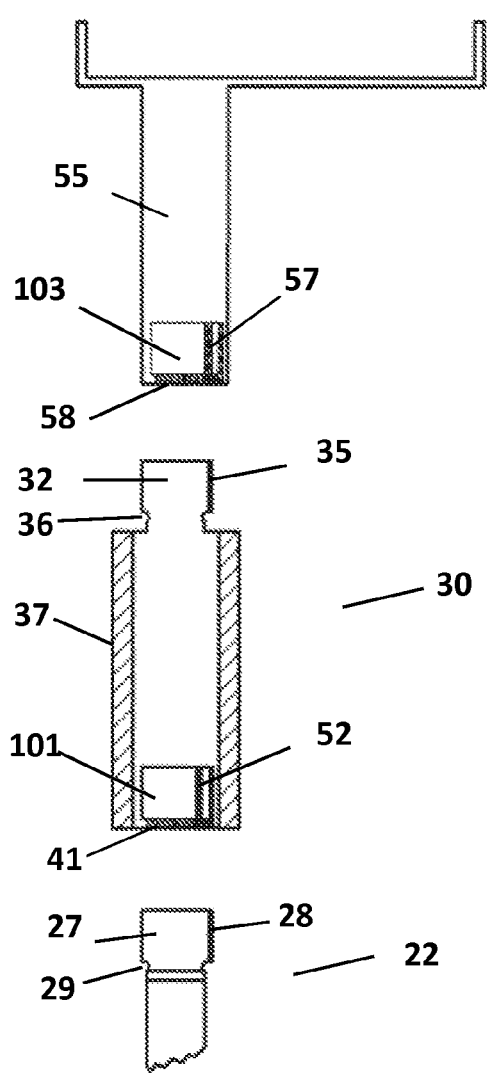
FIGS. 8A and 8B illustrate a preferred mechanism to fast different elements in some of the embodiments according to the instant invention having a single inserting unit.
Figure 8B:
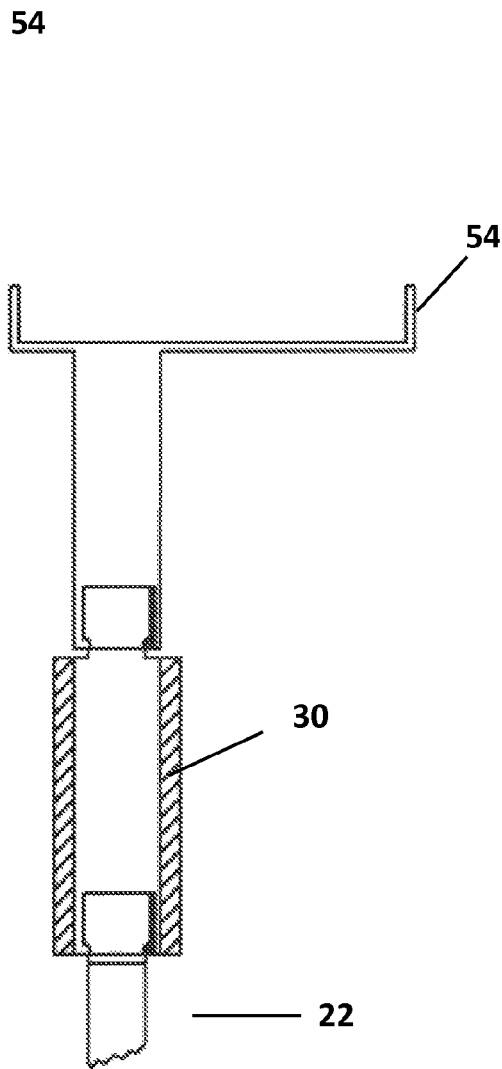

Embodiment 10, as illustrated in FIGS. 8A and 8B, may be assembled by reversibly inserting head 27 of main elongated body 22 inside the hollow cavity 101 of rectangular body of inserting unit 30. In this manner, straight flange 28 on head 27 is cooperatively inserted inside channel 52 on the internal surface of inserting unit 30. Similarly, groove 29 on head 27 is cooperatively matched or inserted with internal bump 41 at the lower end of the internal hollow cavity 101 at inserting unit 30. As a result, main elongated body 22 is secured or fastened to the first inserting unit 30 in a strong but reversible manner. Assembling of embodiment 10 also requires the insertion of head 32 of inserting unit 30 inside the hollow cavity 103 of tray-shaped unit 54. In such connection, straight flange 35 of head 32 at inserting unit 30 is inserted into internal channel 57 of the tray-shaped unit 54, while groove 36 of inserting unit 30 is cooperatively snap on internal bump 58 located at the lower section of internal cavity 103 at lower section 55 on tray-shaped unit 54. In this manner the whole frame of the main structure of embodiment 10 is provided. FIGS. 8A and 8B illustrated the herein disclosed assembling of main structure of embodiment 10.

The required multiple holding elements 11 to 17 are reversibly inserted to the main structure of embodiment 10 by inserting the sliding section 18 of the holding units 11 to 17 into the particular external sliding channel 38 at the rectangular sides on the inserting unit 30, until the top flange 7 of the sliding section 18 at the holding unit, stop over top 6 on rectangular sides at the inserting unit 30 as illustrated on FIG. 10A to 10D. In this manner, flange 9 on the sliding section 18 is cooperatively coupled to indentation 39 on the upper section of channel 38 of the inserting unit 30, thus providing strength to the reversible connection between the corresponding holding unit and inserting unit 30.

Figure 9A:
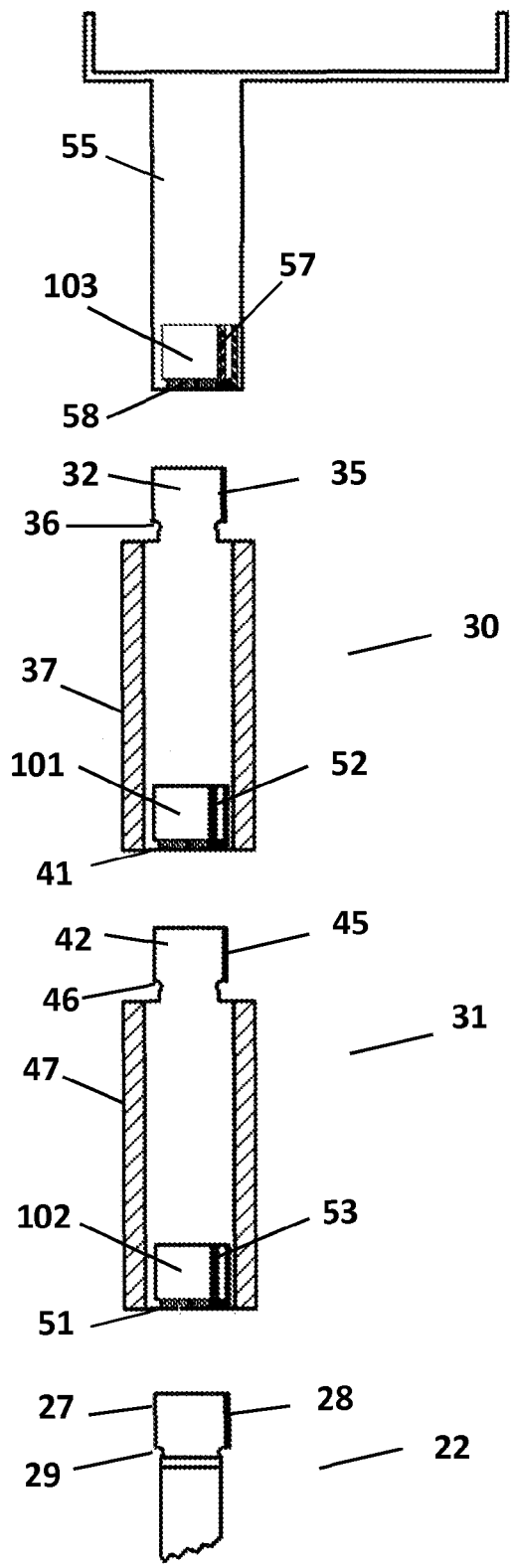
FIGS. 9A and 9B illustrate a preferred mechanism to fast different elements in some of the embodiments according to the instant invention having a two inserting units.
Figure 9B:
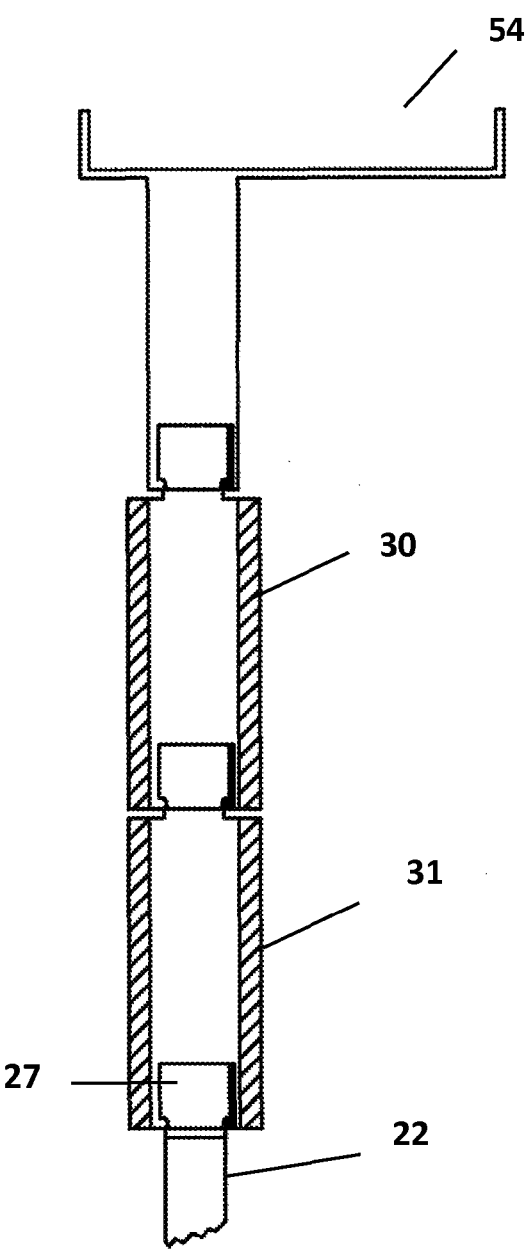

On the other hand, the assembling of embodiment 20, as illustrated in FIGS. 9A and 9B, requires a second inserting unit 31 which will be located between main elongated body 22 and first inserting unit 30. As illustrated in FIGS. 9A and 9B, the main elongated body 22 may be connected to second inserting unit 31 by reversibly inserting head 27 of main elongated body 22 inside the hollow cavity 102 of rectangular body 47 of inserting unit 31. In this manner, straight flange 28 on head 27 is cooperatively inserted inside channel 53 on the internal surface of second inserting unit 31. Similarly, groove 29 on head 27 is cooperatively matched or inserted with internal bump 51 at the lower end of the internal hollow cavity 102 at inserting unit 31. As a result, elongated body 22 is secured or fastened to the second inserting unit 31 in a strong but reversible manner. Assembling of embodiment 20 also requires that the cylindrical top section 42 of second inserting unit 31 is inserted into the bottom section of the first hollow inserting unit 30, wherein straight flange 45 and groove 46 on the upper head 42 of second inserting unit 31 are respectively and reversibly inserted or matched into internal channel 52 and internal bump 41 on the hollow section 101 of the first inserting unit 30. Insertion of head 32 of first inserting unit 30 on the hollow section 103 of tray-shaped unit 54, as explained above for embodiment 10, provides the whole frame of the main structure of holder 20 as illustrated in FIG. 9B. The required multiple holding units 11 to 17 are reversible inserted to the main structure of embodiment 20 by inserting the sliding section 18 of the corresponding holding units into the particular sliding channels 38 and 48 at the rectangular sides on the first and second inserting units 30, 31, respectively, as explained previously and illustrated in FIG. 10A to 10D. In this manner, indentation 39 or 49 at the external sliding channel 38 or 48 is cooperatively coupled or snapped to flange 9 at sliding section 18 of the holding unit, thus providing strength to the reversible connection between the holding unit and the respective inserting units matching said holding units.

Figure 1C:
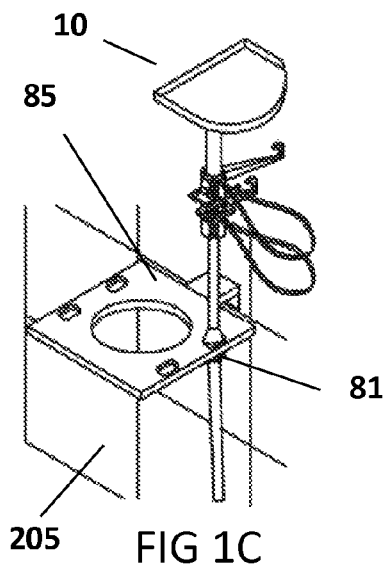
FIG. 1C illustrates an alternative manner of assembling and using some of the embodiments according to the invention.

Embodiments 10 and 20 may be fastened or assembled to a toothbrush support 85, using a fastening means like a threading said nut 81 as illustrated in FIG. 1C for embodiment 10.

Embodiment 10 is illustrated in FIGS. 1A and 1B having three holding units. On the other hand, the assembling of embodiment 40, as illustrated in FIG. 2A, requires a fourth holding unit 13, which is reversible inserted to the main structure of embodiment 40 by inserting the sliding section 18 of the corresponding holding unit into the particular sliding channels 38 at the rectangular sides on the first inserting units 30, as explained previously and illustrated in FIG. 10A to 10D. In this manner, indentation 39 at the external sliding channel 38 is cooperatively coupled or snapped to flange 9 at sliding section 18 of the holding unit, thus providing strength to the reversible connection between the holding unit and the respective inserting unit matching said holding unit. The FIG. 2B, shows the embodiment 40 supported by a stand 80, using any suitable fastening mechanism, such as threading nut 81. FIG. 2C illustrates an exploded view of the embodiment 40 over a stand 80.

FIG. 4A shows embodiment 20 supported by a stand 80, using any suitable fastening mechanism, such as threading nut 81, while FIG. 4B illustrates an exploded view of the embodiment 20 over a stand 80.

For instance, lower elongated section 24 of main elongated body 22 is inserted into the hole 82 of stand 80, after the threaded nut 81 is already inside slot 83. Threading said nut 81 firmly connect main elongated body 22 to stand 80, as illustrated in FIGS. 2B and 4A. Stand 80 is particularly designed with an enclosed section 84, in order to retain any small amount of water coming from any items being hold.

Embodiments 10, 20 and 40 illustrates a manner of alternatively increasing or decreasing the number of holding units 11 to 17 presented in each particular embodiment by adding or subtracting inserting units elements such as 30 and 31 at the convenience or needs of the user. The scope of the invention also incorporates embodiments wherein the amount of inserting units may be increased in order to provide extra holding units elements. Similarly, to the discretion of the user, a particular embodiment of the invention may be used to hold one or more personal items. Alternatively, due to the versatility of some holding units, the user may also selects among the holding units those particular holding units that he or she understands fulfill his or her personal needs. Thus, each holding element type adds versatility to the invention.

FIG. 12 illustrates a perspective view of another embodiment of the invention 50 while in FIG. 13 an exploded view of embodiment 50 is shown. Embodiment 50 comprises all parts comprised by embodiment 10, comprising a main elongated body 22, an inserting unit 30, a tray-shaped unit 54, and multiple holding elements, wherein all these parts have the same limitations or characteristics as described previously for embodiment 10 and/or 20. Such parts may be reversibly interconnected as previously described and explained in the description of embodiment 10 or 20 above. In addition to the parts of embodiment 10, the embodiment 50 comprises a supporting unit 88 and a suction cup 86 having a flange 87, which are illustrated in FIGS. 14A to 14D, where in addition is shown the way of connecting the supporting unit 88 to the inserting unit 30 and the suction cup 86 to the supporting unit 88. The assembly of embodiment 50 requires a supporting unit 88 having internal channel 89 and slot 91 at the back side and an external sliding channel 92. At the upper section of said external channel 92, it also comprises a flange 93 and holes 94 passing through its body and preferably located near the upper and bottom ends of the external channel 92.

Suction cup 86 may be reversible connected to supporting unit 88 by inserting flange 87 of the suction cup 86 into internal channel 89 of the supporting unit 88. The FIG. 14 shows suction cup 86 and supporting unit 88 partially connected. Alternatively, suction cup 86 may be permanently connected to supporting unit 88 as a single piece.

Figure 14A:
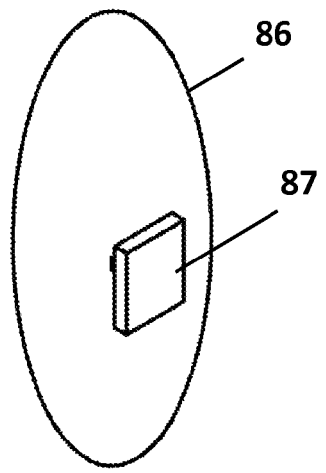
FIG. 14A to 14D illustrate the parts and mechanism used to hold the embodiment illustrated in FIG. 12 over a given surface. These figures illustrate the supporting unit and the suction cup in more details.
Figure 14B:
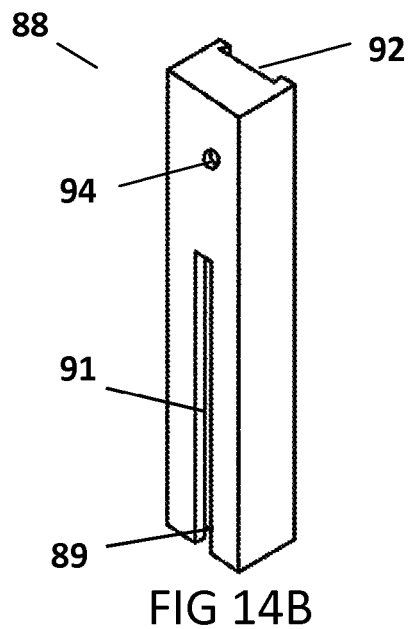
Figure 14C:
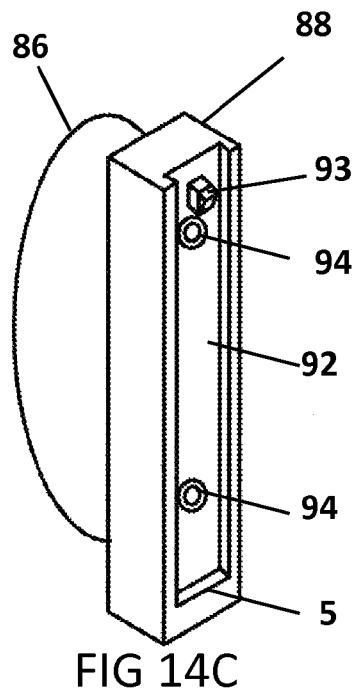
Figure 14D:
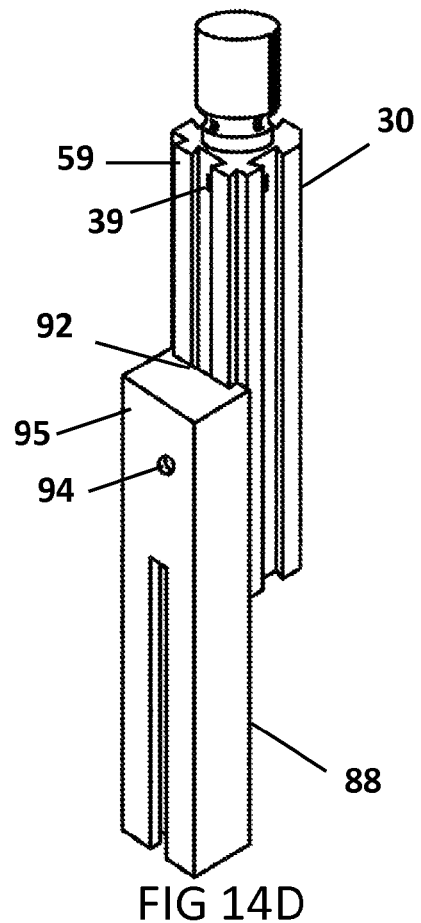
Figure 15A:
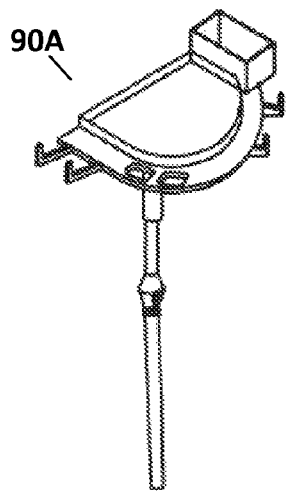
FIG. 15A to 15D illustrate different views of other embodiment according to the invention.
Figure 15B:
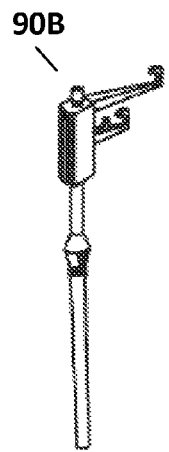
Figure 15C:
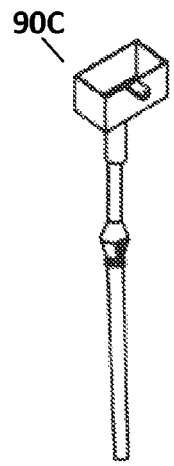
Figure 15D:
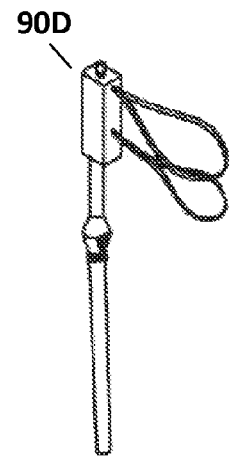
Figure 16A:
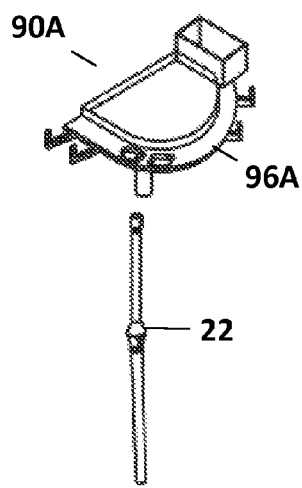
FIG. 16A to 16D illustrate different exploded views of the respective embodiments illustrated in FIGS. 15A to 15D.
Figure 16B:
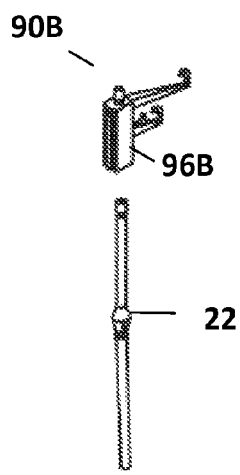
Figure 16C:
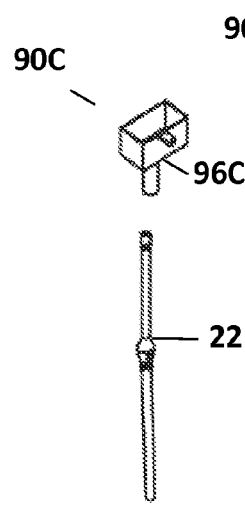
Figure 16D:
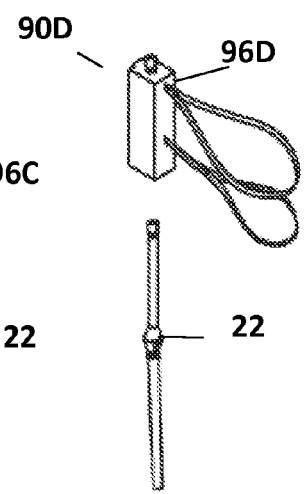

As illustrated in FIG. 14D, one of the sides of inserted unit 30 may be inserted into external channel 92 of supporting unit 88, thus connecting reversibly both parts; supporting unit 88 and inserting unit 30. Embodiment 50 may be assembled to a wall by means of a suitable fastening means using supporting unit 88. For instance, fastening supporting unit 88 to a wall requires passing two nails, screws or any suitable fastening means through openings 94 or gluing the back 95 of the supporting unit and further sliding the corresponding side 59 of the inserting unit 30 through the external channel 92 on the supporting unit 88, allows the fastening of embodiment 50 to a wall. Alternatively, suction cup 86 may be used to hold embodiment 50 to a given surface such as a mirror surface or a wall when flange 87 is inserted into internal channel 89 of supporting unit 88 and further assembling supporting unit 88 to the inserting unit 30, allowing the flange 93 to cooperatively coupled to indentation 39 of inserting unit 30, as already explained. Suction cup 86 may then be press to a desirable surface in order to support embodiment 50 to a given or selected surface.

FIG. 15A-15D illustrates examples of embodiments of the invention 90A to 90D, which comprise a main elongated body 22 as the previously described for embodiments 10 and 20; and comprise holding units 96A to 96D as illustrated on the exploded views on FIG. 16A to 16D. The FIG. 17A to 17D illustrate cross sectional views of holding units 96A to 96D comprising a main body 97A to 97D and its holding element 99A to 99D. The FIG. 17E to 17G illustrate the mechanism of coupling the holding unit 96B to the main elongated body 22, which applies to all embodiment 90A to 90D illustrated in FIG. 15A to 15D. The holding units 96A to 96D as shown here for holding unit 96B comprise a hollow cylindrical internal section 104 with at least one internal channel 98 and an internal bump 100, which is located at the lower end of said hollow cylindrical section 104 and a holding element 99A to 99D. Embodiments 90A to 90D are assembled by inserting the upper head 27 or top section of main elongated body 22 inside hollow internal section 104 of the corresponding holding unit 96A to 96D in a manner that during the insertion process, the straight flange 28 on the head 27 at the main elongated body 22 is slip in the internal channel 98, while the internal bump 100 is snap into the groove 29 on the head 27 at the main elongated body 22.

Figure 20A:
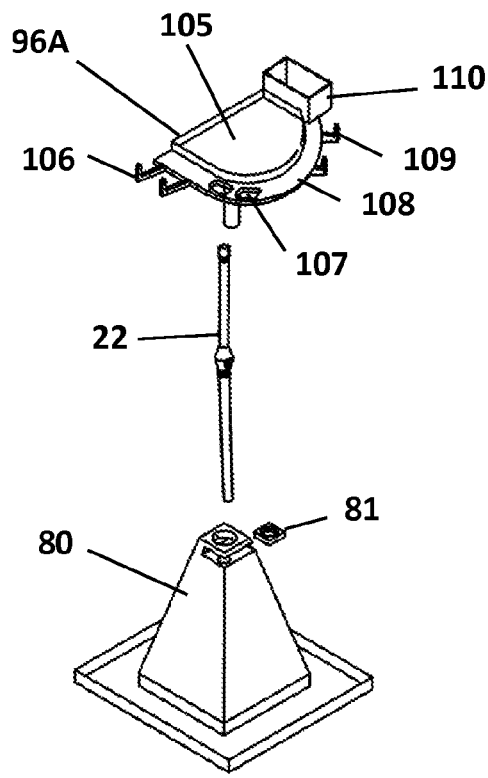
FIGS. 20A and 20D illustrate exploded views of the embodiments as shown in FIGS. 19A to 19D and its parts thereof.
Figure 20B:
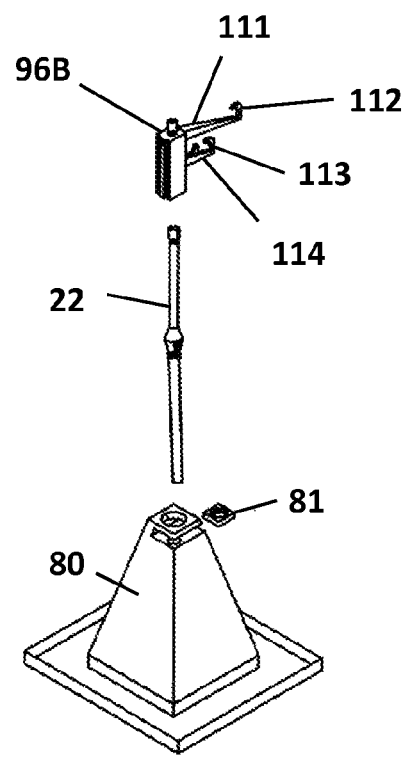
Figure 20C:
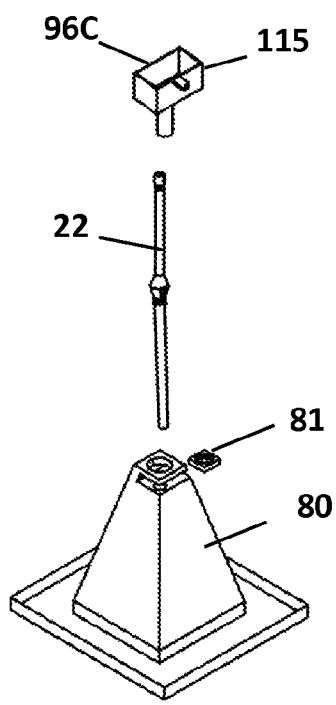
Figure 20D:
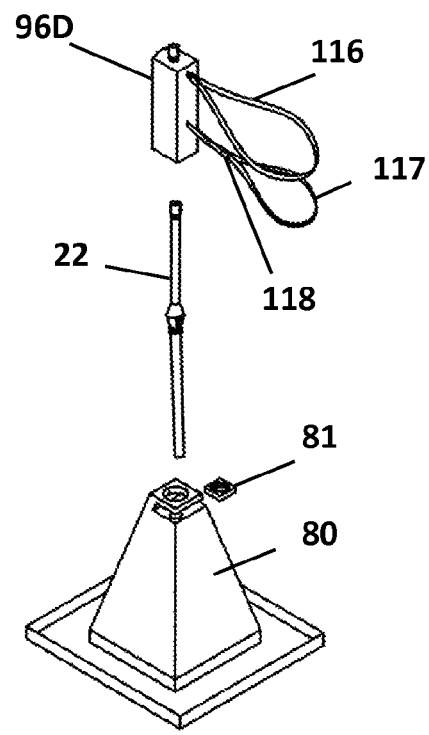
Figure 21A:
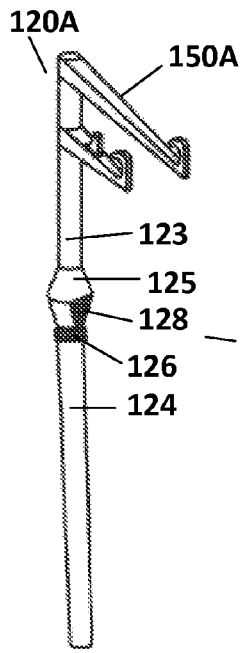
FIG. 21A to 21G illustrate perspective views of another embodiment according to the instant invention.
Figure 21B:
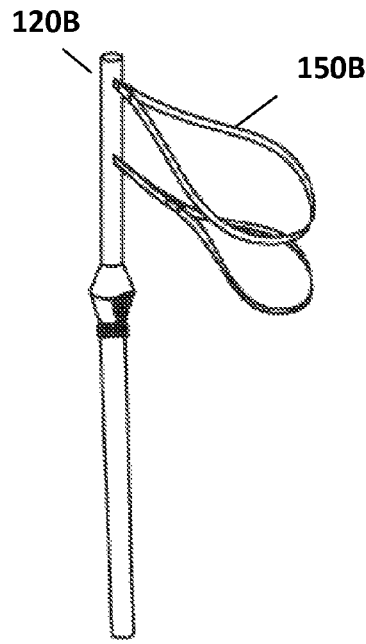
Figure 21C:
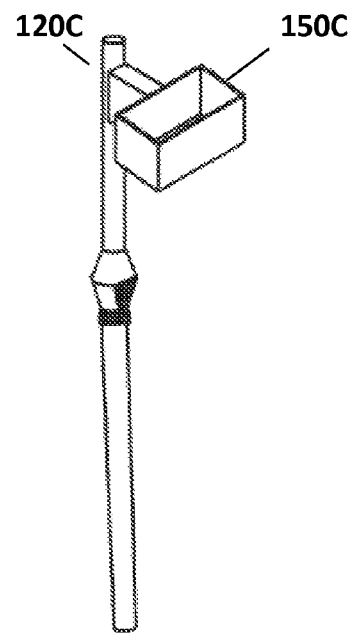
Figure 21D:
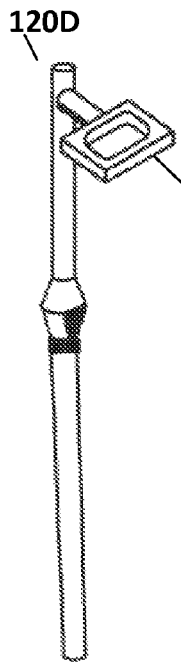
Figure 21E:
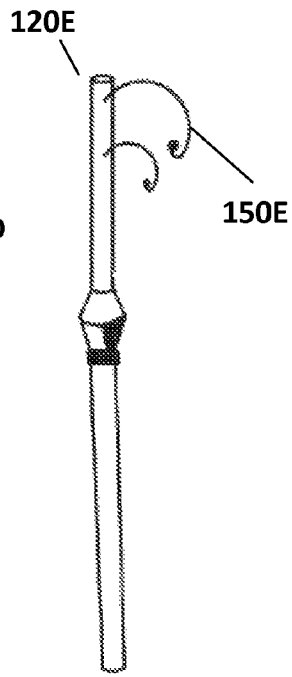
Figure 21F:
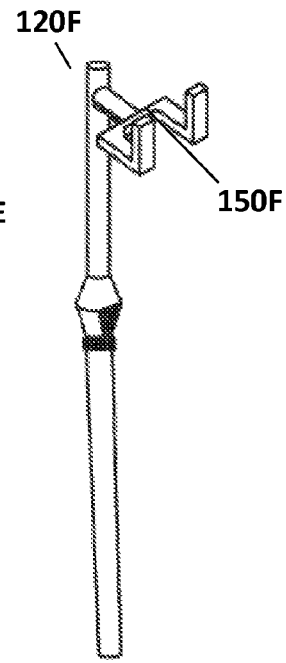
Figure 21G:
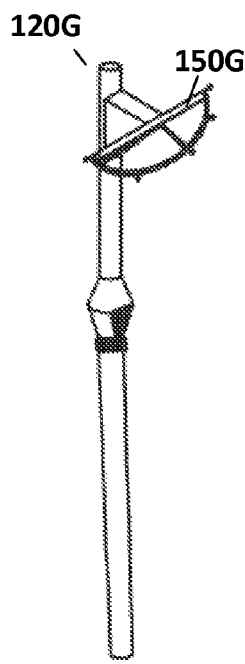

Regarding the holding unit 96A to 96D, and as illustrated in FIGS. 16A to 16D and FIG. 20A to 20D, it have different geometries capable of adapting to the item being held. For instance, holding unit 96A comprises a multi-functional holding unit having a round or semi-round tray-type structure 105 surrounded by hooks 106, 109, holes 107 and a small box 110 as illustrated in FIG. 20A; holding unit 96B comprises two extended arms 111 and 114 as illustrated in FIG. 20B. On the other hand, holding unit 96C comprises a box-shaped holding element 115 as illustrated in FIG. 20C; while FIG. 20D shows the holding unit 96D comprising a lace-shaped holding elements 116 and 117 with an adjusting ring 118.

Figures 18A, 18B:
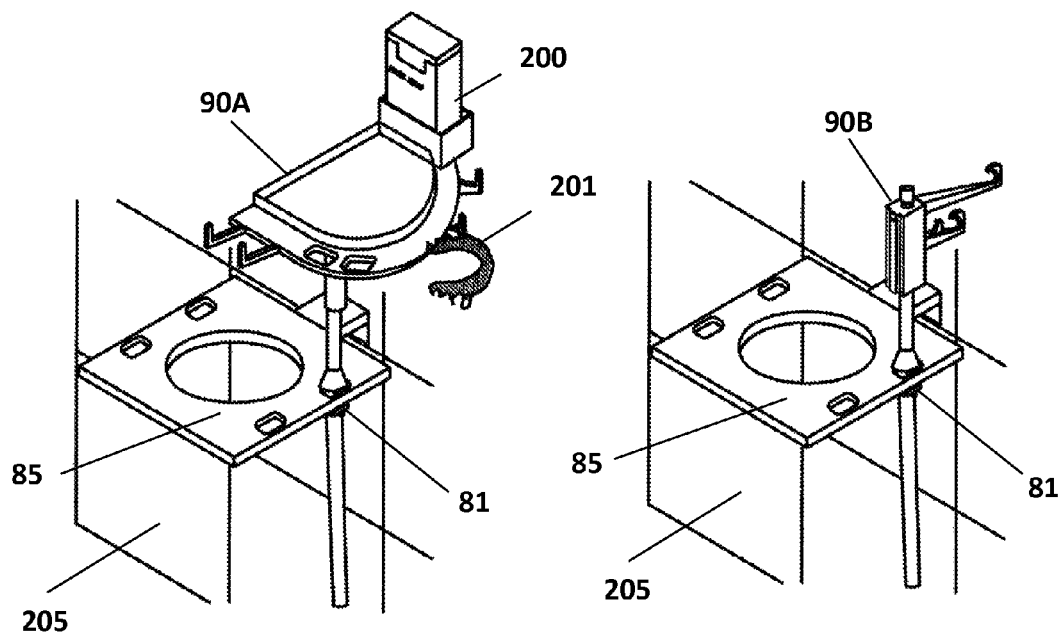
FIG. 18A to 18D illustrate different views showing alternative manners of assembling and using the embodiments illustrated in FIGS. 15A and 15D.
Figures 18C, 18D:
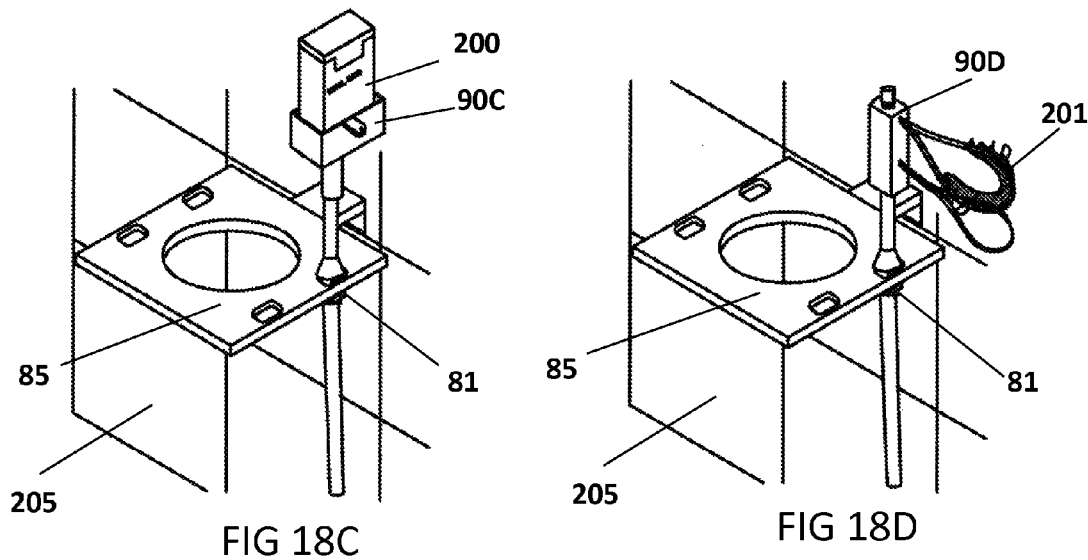
Figure 19A:
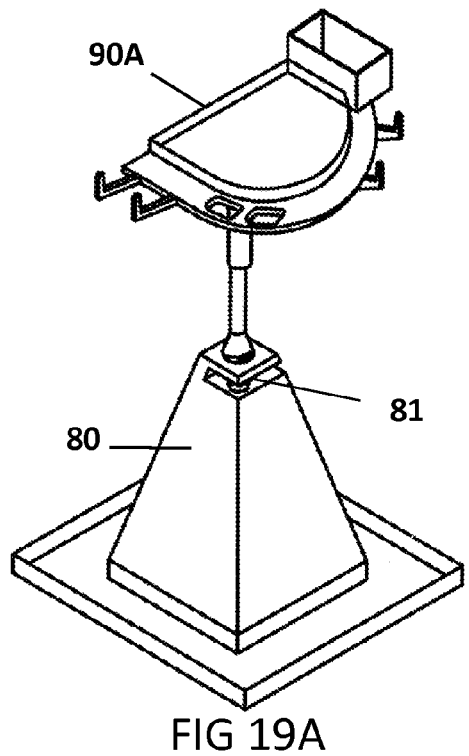
FIG. 19A to 19D illustrate perspective views of another alternative manners of assembling the embodiments illustrated in FIGS. 15A and 15D.
Figure 19B:
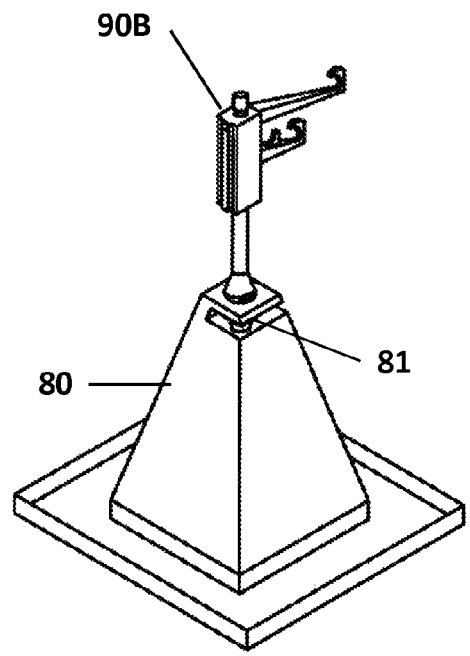
Figure 19C:
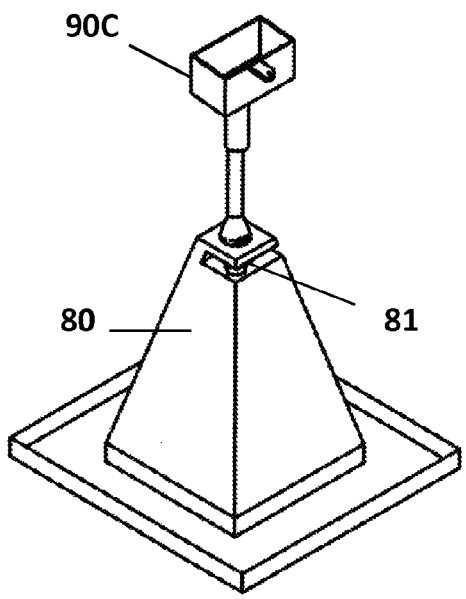
Figure 19D:
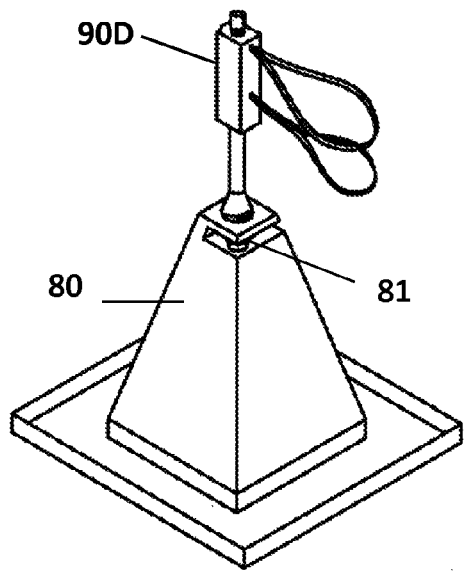

It is understood that any other variation of the holding unit having similar hanging or holding elements as the one herein described are within the scope of the instant invention. FIG. 18A to 18D shows an alternative manner of assembling embodiments 90A to 90D using a toothbrush holder 85 fastened with a threaded nut 81 and it shows examples of use of the instant invention. For instance dental floss 200 is shown stored at embodiment 90A and 90C as shown in FIGS. 18A and 18C respectively, in another instance orthodontic retainer 201 is shown stored on embodiment 90A and 90D as shown on FIG. 18A and FIG. 18D respectively. FIG. 19A to 19D show another alternative of assembly embodiment 90A to 90D using an optional supporting base or stand 80 and fastening means 81, while FIG. 20A to 20D show the exploded view of FIG. 19A to 19D illustrating the embodiment 90A to 90D over a stand 80.

Other embodiments of the invention, 120A to 120G are illustrated in FIG. 21A to 21G. All of them comprise a main elongated body 122 having first elongated section 123, a second elongated section 124 and a fastening section 125, located between the first elongated section 123 and the second elongated section 124. Fastening section 125 has preferably a wider diameter than the diameter of the first and second elongated sections, 123, 124 and it also has at it fastening section 125, a threaded section 126 and a flat section 128. It also comprises holding elements 150A to 150G, having different geometries and permanently connected at the surface of the first elongated section 123 at main elongated body 122.

FIG. 22A to 22G shows embodiment of the invention 130A to 130G comprising a main elongated body 122 comprising a head section 127 at top of main elongated body 122, comprising the head section 127 a straight flange 128 and groove 129. Said head may be used to be inserted in an inserting unit 30 or 31 as previously described in embodiments 10 and 20, or in holding unit 96A to 96D of embodiment 90A to 90D in order to provide additional embodiments that are inside the scope of the instant invention. It also comprises holding elements 150A to 150G, having different geometries and permanently connected at the surface of the first elongated section 123 at main elongated body 122.

Figure 22A:
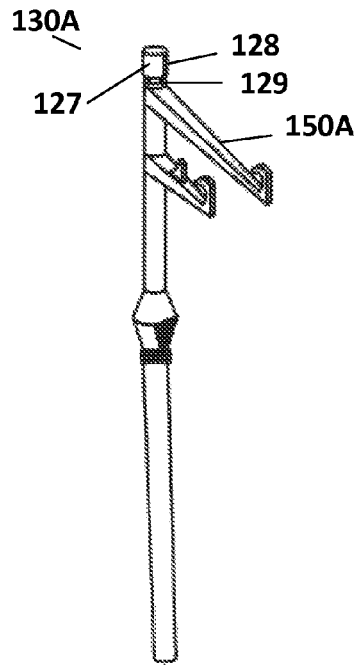
FIG. 22A to 22G illustrate perspective views of another embodiment according to the instant invention.
Figure 22B:
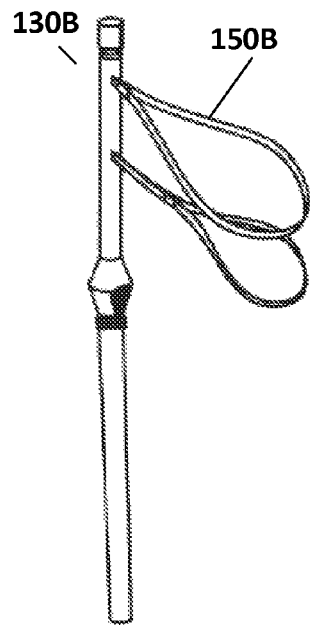
Figure 22C:
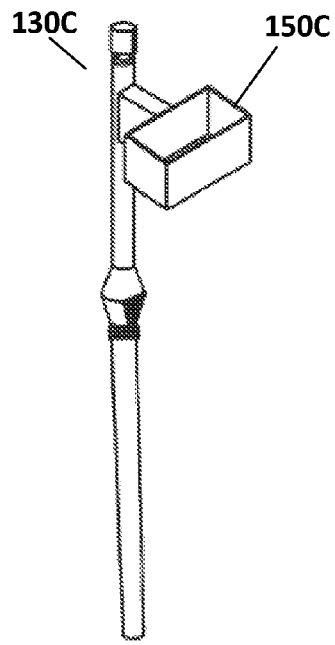
Figure 22D:
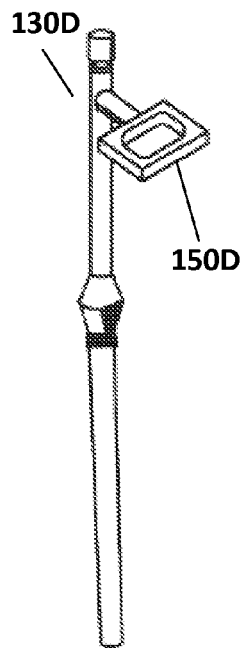
Figure 22E:
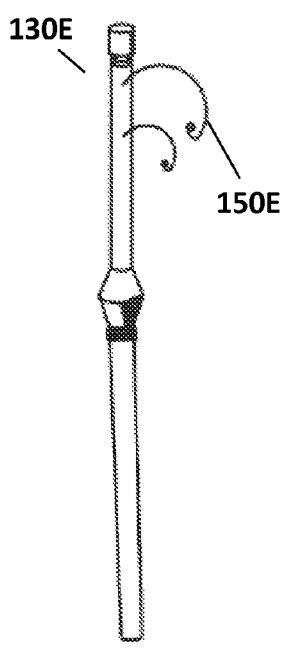
Figure 22F:
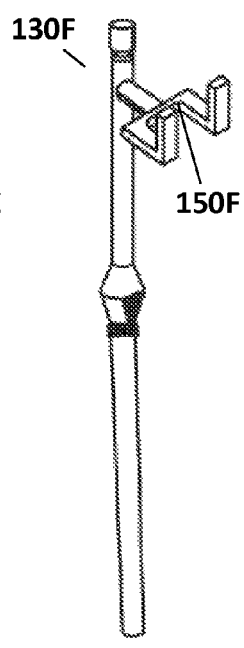
Figure 22G:
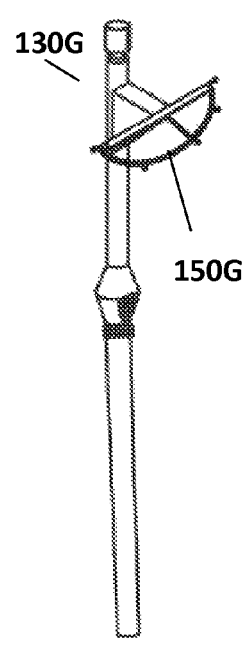
Figure 23A:
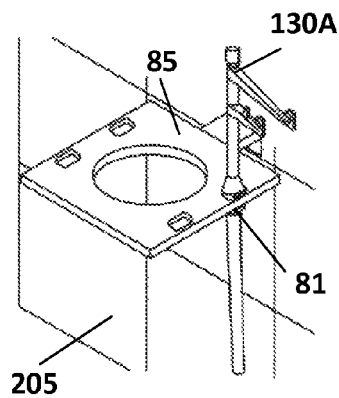
FIG. 23A to 23G illustrate different views showing alternative manners of assembling the embodiments of the invention illustrated in FIGS. 22A and 22G.
Figure 23B:
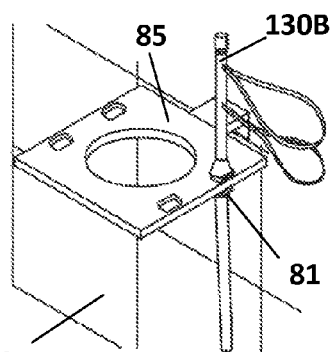
Figure 23C:
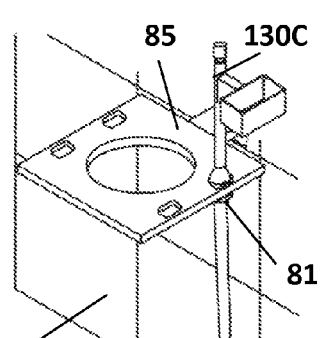
Figure 23D:
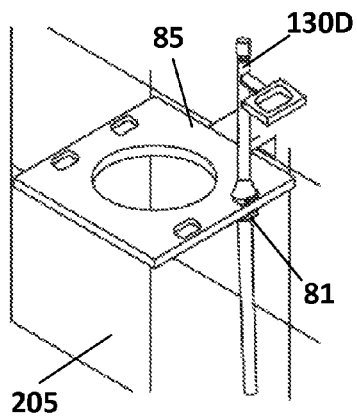
Figure 23E:
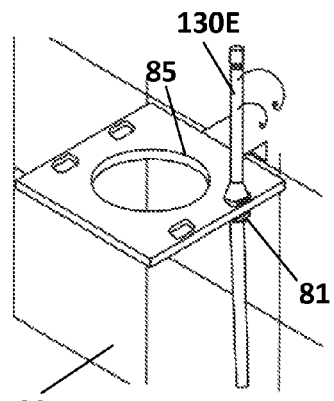
Figure 23F:
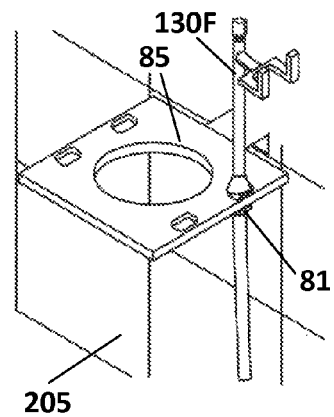
Figure 23G:
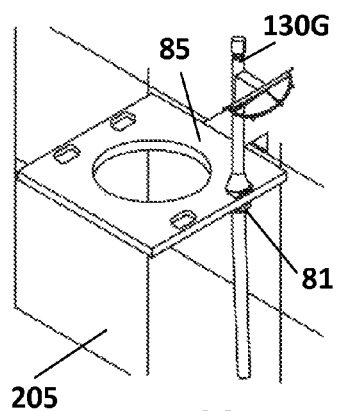
Figure 24A:
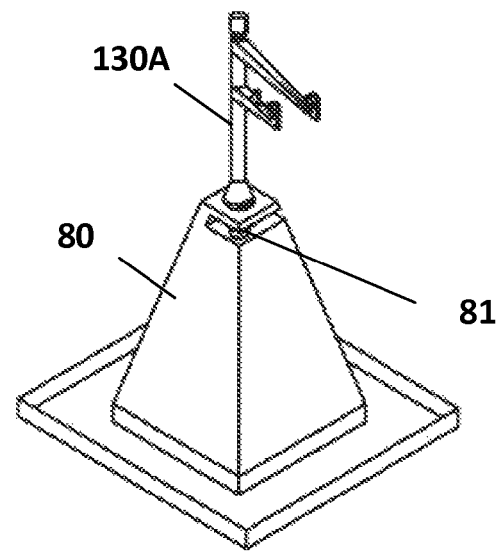
FIG. 24A to 24G illustrate perspective views of an alternative manner of assembling the embodiments illustrated in FIGS. 22A and 22G.
Figure 24B:
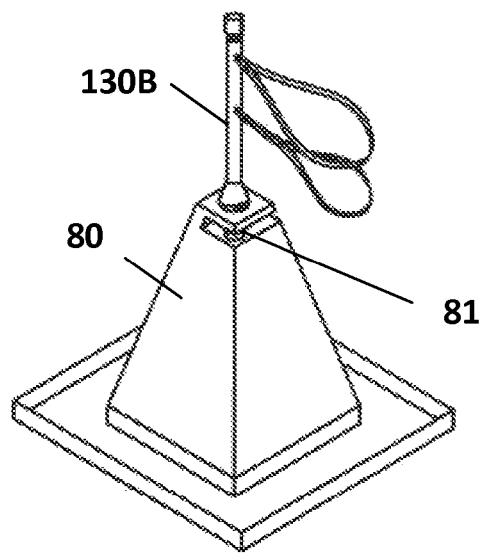
Figure 24C:
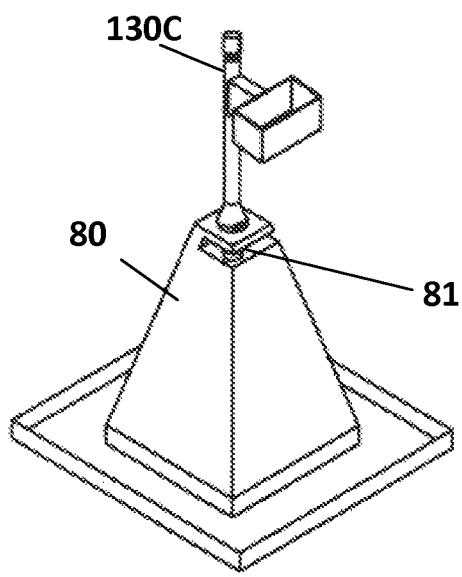
Figure 24D:
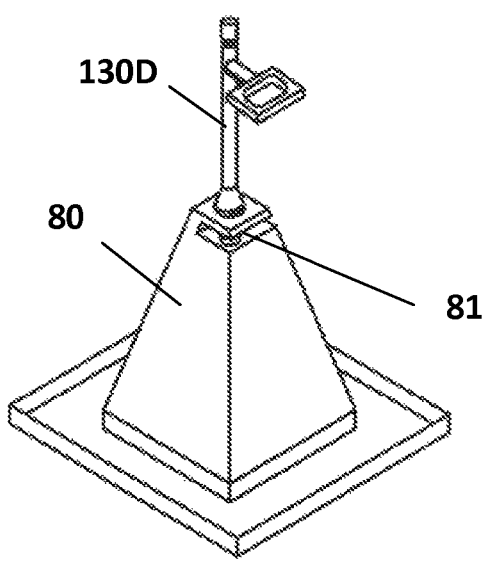
Figure 24E:
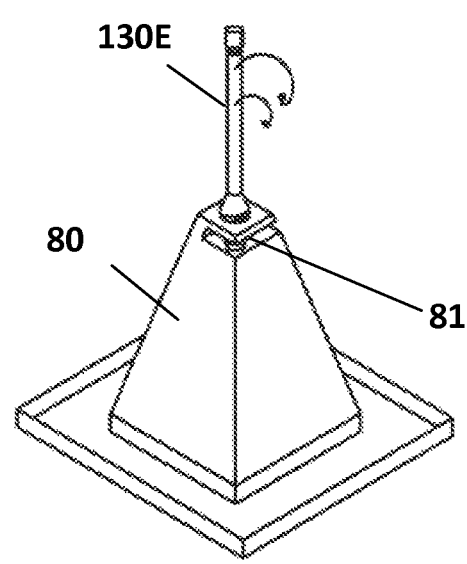
Figure 24F:
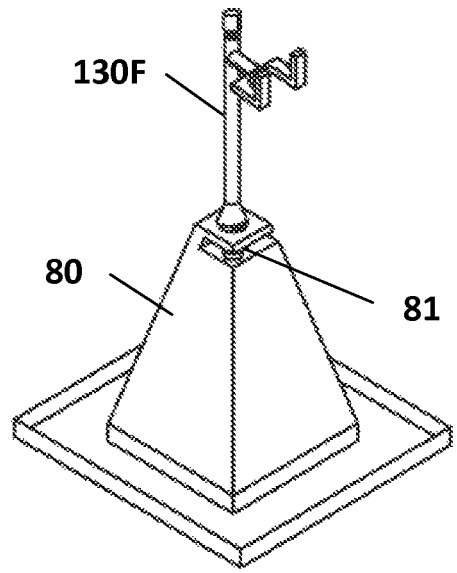
Figure 24G:
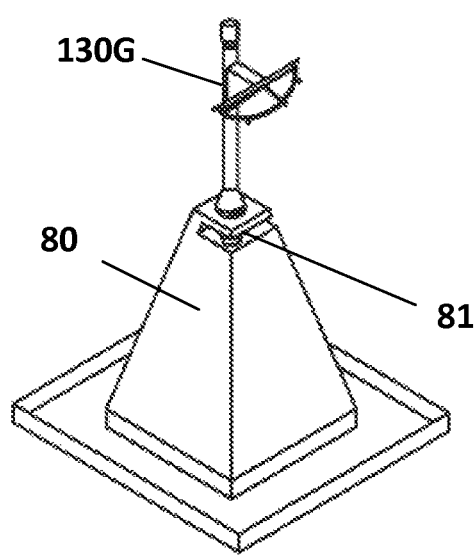

With regards to the geometry of the holding elements, it may be anyone of the already illustrated above in holding units 11 to 17. For illustration purposes, embodiment 130A has a set of extended arms holding elements 150A as illustrated in FIG. 22A and previously described for embodiment 10 and 20. On the other hand, embodiment 130B comprises lace-shaped holding elements having a size adjusting ring in order to increase or decrease the internal size of lace-shaped holding elements 150B as illustrated in FIG. 22B as previously described for embodiment 10 and 20. As illustrated on FIG. 22C embodiment 130C comprises a box-shaped holding element 150C. The embodiment 130D comprises a rectangular-shaped holding element 150D with a hole at it center as shown on FIG. 22D, while FIG. 22E shows the embodiment 130E comprising a semi-circular wires holding elements 150E. The FIG. 22F illustrates the embodiment 130F comprising a U-shaped structure holding element 150F bend over at an upright position, which is useful for holding manual razors. The FIG. 22G illustrates the embodiment 130G comprising a D-shaped structure holding element 150G having a series of solid round units around the external surface of said D-shaped structure holding element, which is useful to hold orthodontic retainers and jewelry items as previously described for embodiment 10 and 20.

It is understood that any other variation of the holding unit having similar hanging or holding elements as the one herein described are within the scope of the instant invention. FIG. 23A to 23G shows an alternative manner of assembling embodiments 130A to 130G using a toothbrush holder 85 and fastened with a threaded nut 81. FIG. 24A to 24G show another alternative manner of assembly embodiment 130A to 130G using an optional supporting base or stand 80 and fastening means 81.

What is claim is:

1. A holder comprising:
    a main elongated body comprising a first upper head, a first groove, a first elongated section, a second elongated section and a fastening section:
    wherein said first upper head comprises an first external surface and a first coupling section;
    wherein said first elongated section comprises a first proximal end and a first distal end;
    wherein said second elongated section comprises a first diameter, a second proximal end and a second distal end;
    wherein said first groove is located between said first distal end and said upper head;
    wherein said fastening section comprises a second diameter, wherein said second diameter is wider than the first diameter;
    wherein said the first diameter is reduced towards the second elongated section;
    wherein said fastening section comprises a tapered section comprising a flat surface; and
    wherein said fastening section is located between the first proximal end and the second distal end.

2. The holder as recited in claim 1, wherein said first coupling section further comprises a first flange, wherein said first flange extends away from said first external surface.

3. The holder as recited in claim 2, further comprising a holding unit including a tray unit;
    wherein said tray unit comprises a upper tray-shaped section and a main holding body including a hollow body section, an internal bump and an internal channel;
    wherein said internal channel comprises a recess;
    wherein said internal channel is located inside said hollow body section;
    wherein said recess is configured to engage with the first flange; and
    wherein said internal bump is configured to engage the first groove.

4. The holder as recited in claim 2, further comprising a holding unit, wherein said holding unit comprises: a main holding body including an external coupling section, a hollow body section, an internal bump and an internal channel;
    wherein said internal channel comprises a recess;
    wherein said internal channel is located inside said hollow body section;
    wherein said recess is configured to engage with the first flange; and
    wherein said internal bump is configured to engage the first groove.

5. The holder as recited in claim 4, wherein said holding unit comprises a second upper head and a second groove;
    wherein said second upper head comprises a second external surface and at least a second coupling section; and
    wherein said groove is located between said main holding body and said second upper head.

6. The holder as recited in claim 5, wherein said second coupling section further comprises at least a second flange wherein said second flange extend away from said second external surface.

7. The holder as recited in claim 4, further comprising a holding element, wherein said external coupling section comprises a surface sliding channel; and
    wherein said holding element is attached to said external surface sliding channel.

8. The holder as recited in claim 7, wherein the holding element comprises an extended arm having curved ends.

9. The holder as recited in claim 7, wherein the holding element comprises a lace-shaped element having a size adjusting ring.

10. The holder as recited in claim 7, wherein the holding element comprises one rectangular open box.

11. The holder as recited in claim 7, wherein the holding element comprises a rectangular-shaped element having a central hole.

12. The holder as recited in claim 7, wherein the holding element comprises a string-shaped element.

13. The holder as recited in claim 7, wherein the holding element comprises a U-shaped element, wherein said U-shaped element comprises a U-shape form.

14. The holder as recited in claim 7, wherein the holding element comprises a D-shaped element.

15. The holder as recited in claim 1, further comprising a threaded section, wherein said threaded location is located at the second distal end.

16. The holder as recited in claim 1, further comprising a standing base wherein the second elongated section is inserted.

\* \* \* \* \*